/

US010815059B2

(12) United States Patent
Otto et al.

(10) Patent No.: US 10,815,059 B2
(45) Date of Patent: Oct. 27, 2020

(54) SYSTEMS AND METHODS FOR HOME POSITION AND CART ACQUISITION WITH A MATERIALS HANDLING VEHICLE

(71) Applicant: Crown Equipment Corporation, New Bremen, OH (US)

(72) Inventors: Matthew J. Otto, New Bremen, OH (US); Gregory S. Garmann, Maria Stein, OH (US); Mark E. Addison, Ludlow Falls, OH (US)

(73) Assignee: Crown Equipment Corporation, New Bremen, OH (US)

( * ) Notice: Subject to any disclaimer, the term of this patent is extended or adjusted under 35 U.S.C. 154(b) by 217 days.

(21) Appl. No.: 16/129,946

(22) Filed: Sep. 13, 2018

(65) Prior Publication Data

US 2019/0092569 A1   Mar. 28, 2019

Related U.S. Application Data

(63) Continuation of application No. 15/602,781, filed on May 23, 2017, now Pat. No. 10,106,321.

(60) Provisional application No. 62/340,071, filed on May 23, 2016, provisional application No. 62/340,513, filed on May 23, 2016.

(51) Int. Cl.
*G01C 22/00* (2006.01)
*B65G 1/04* (2006.01)
(Continued)

(52) U.S. Cl.
CPC ........ *B65G 1/0492* (2013.01); *B65G 1/0407* (2013.01); *B65G 1/1375* (2013.01);
(Continued)

(58) Field of Classification Search
CPC ... B65G 1/0492; B65G 1/0407; B65G 1/1375
See application file for complete search history.

(56) References Cited

U.S. PATENT DOCUMENTS 5,032,994 A   7/1991  Wellman
6,135,694 A  10/2000  Trego et al.
(Continued)

FOREIGN PATENT DOCUMENTS

DE          2034834 A1    1/1972
DE    102006020491 A1   10/2007
(Continued)

*Primary Examiner* — Adam M Alharbi
(74) *Attorney, Agent, or Firm* — Dinsmore & Shohl LLP

(57) ABSTRACT

A variety of vehicle-based and warehouse-based solutions are provided to increase the adaptability, utility, and efficiency of materials handling vehicles in the warehouse environment, such as a goods storage and retrieval system, comprising a multilevel warehouse racking system, a mobile storage cart, a cart home position, and a materials handling vehicle disposed on a vehicle transit surface and comprising a fork carriage assembly, a navigation subsystem, a cart engagement subsystem, and one or more vehicular controllers to use the navigation subsystem to navigate the materials handling vehicle along the vehicle transit surface to a localized engagement position where the cart home position is within a cart engagement field of view, and use the cart engagement subsystem to engage the mobile storage cart in the cart home position with the fork carriage assembly.

20 Claims, 18 Drawing Sheets

(51) Int. Cl.
  *B66F 9/07* (2006.01)
  *B66F 9/14* (2006.01)
  *B66F 9/18* (2006.01)
  *B65G 1/137* (2006.01)
  *B66F 9/075* (2006.01)
  *B66F 9/12* (2006.01)

(52) U.S. Cl.
  CPC ............ *B66F 9/07* (2013.01); *B66F 9/07504* (2013.01); *B66F 9/07581* (2013.01); *B66F 9/12* (2013.01); *B66F 9/141* (2013.01); *B66F 9/18* (2013.01); *B65G 2209/06* (2013.01)

(56) References Cited

U.S. PATENT DOCUMENTS

| | | |
|---|---|---|
| 7,017,689 B2 | 3/2006 | Gilliland et al. |
| 7,681,963 B2 | 3/2010 | Sherman et al. |
| 7,894,933 B2 | 2/2011 | Mountz et al. |
| 8,046,160 B2 | 10/2011 | Carter et al. |
| 8,131,422 B2 | 3/2012 | Jensen et al. |
| 8,718,860 B2 | 5/2014 | Waltz et al. |
| 9,174,830 B1 | 11/2015 | Bell |
| 9,327,952 B1 | 5/2016 | Kolharkar et al. |
| 9,340,399 B2 | 5/2016 | Bell |
| 9,440,698 B2 | 9/2016 | Dadoosh et al. |
| 2012/0312740 A1* | 12/2012 | Roberts ................ B01D 21/003 210/521 |
| 2014/0070504 A1* | 3/2014 | Martin ..................... B62B 3/02 280/47.35 |
| 2016/0129592 A1 | 5/2016 | Saboo et al. |

FOREIGN PATENT DOCUMENTS

| | | |
|---|---|---|
| EP | 1203745 A1 | 5/2002 |
| GB | 2460326 A | 12/2009 |
| JP | 2000247598 A | 9/2000 |
| WO | 2004000697 A1 | 12/2003 |

* cited by examiner

SYSTEMS AND METHODS FOR HOME POSITION AND CART ACQUISITION WITH A MATERIALS HANDLING VEHICLE

CROSS-REFERENCE TO RELATED APPLICATIONS

This application is a continuation of U.S. Non-Provisional application Ser. No. 15/602,781, which claims the benefit of U.S. Provisional Application Ser. Nos. 62/340,071 and 62/340,513, both filed May 23, 2016, all of which are incorporated by reference in their entireties herein. This application is related, but does not claim priority, to U.S. patent application Ser. No. 15/602,738, filed May 23, 2017, and Ser. No. 15/602,752, filed May 23, 2017, and International PCT Patent Application Serial No. PCT/US2017/034026, filed May 23, 2017.

BACKGROUND

The present disclosure relates to materials handling vehicles and warehousing solutions related thereto.

BRIEF SUMMARY

According to the subject matter of the present disclosure, a variety of vehicle-based and warehouse-based solutions are provided to increase the adaptability, utility, and efficiency of materials handling vehicles in the warehouse environment.

In accordance with one embodiment of the present disclosure, a goods storage and retrieval system comprises a multilevel warehouse racking system, a mobile storage cart, a cart home position, and a materials handling vehicle disposed on a vehicle transit surface. The materials handling vehicle comprises a fork carriage assembly, a cart engagement subsystem, a navigation subsystem, and one or more vehicular controllers. The one or more vehicular controllers are in communication with the cart engagement subsystem and the navigation subsystem. The cart engagement subsystem is characterized by a cart engagement field of view. The one or more vehicular controllers of the materials handling vehicle executes vehicle functions to: (i) use the navigation subsystem to navigate the materials handling vehicle along the vehicle transit surface to a localized engagement position where the cart home position is within the cart engagement field of view, and (ii) use the cart engagement subsystem to engage the mobile storage cart in the cart home position with the fork carriage assembly.

In accordance with yet another embodiment of the present disclosure, a materials handling vehicle configured to navigate a vehicle transit surface comprises a fork carriage assembly, a cart engagement subsystem, a navigation subsystem, and one or more vehicular controllers in communication with the cart engagement subsystem and the navigation subsystem. The cart engagement subsystem is characterized by a cart engagement field of view. The one or more vehicular controllers of the materials handling vehicle executes vehicle functions to: (i) use the navigation subsystem to navigate the materials handling vehicle along the vehicle transit surface to a localized engagement position where a cart home position is within the cart engagement field of view, and (ii) use the cart engagement subsystem to engage a mobile storage cart in the cart home position with the fork carriage assembly.

In accordance with yet one other embodiment of the present disclosure, a method of operating a goods storage and retrieval system comprises providing the goods storage and retrieval system comprising a multilevel warehouse racking system, a mobile storage cart, a cart home position, and a materials handling vehicle disposed on a vehicle transit surface. The materials handling vehicle comprises a fork carriage assembly, a cart engagement subsystem, a navigation subsystem, and one or more vehicular controllers in communication with the cart engagement subsystem and the navigation subsystem. The cart engagement subsystem is characterized by a cart engagement field of view. The method further comprises navigating the materials handling vehicle along the vehicle transit surface to a localized engagement position where the cart home position is within the cart engagement field of view through use of the navigation subsystem and the one or more vehicular controllers, and engaging the mobile storage cart in the cart home position with the fork carriage assembly through use of the cart engagement subsystem.

BRIEF DESCRIPTION OF THE SEVERAL VIEWS OF THE DRAWINGS

The following detailed description of specific embodiments of the present disclosure can be best understood when read in conjunction with the following drawings, where like structure is indicated with like reference numerals and in which.

DETAILED DESCRIPTION

Figure 1:
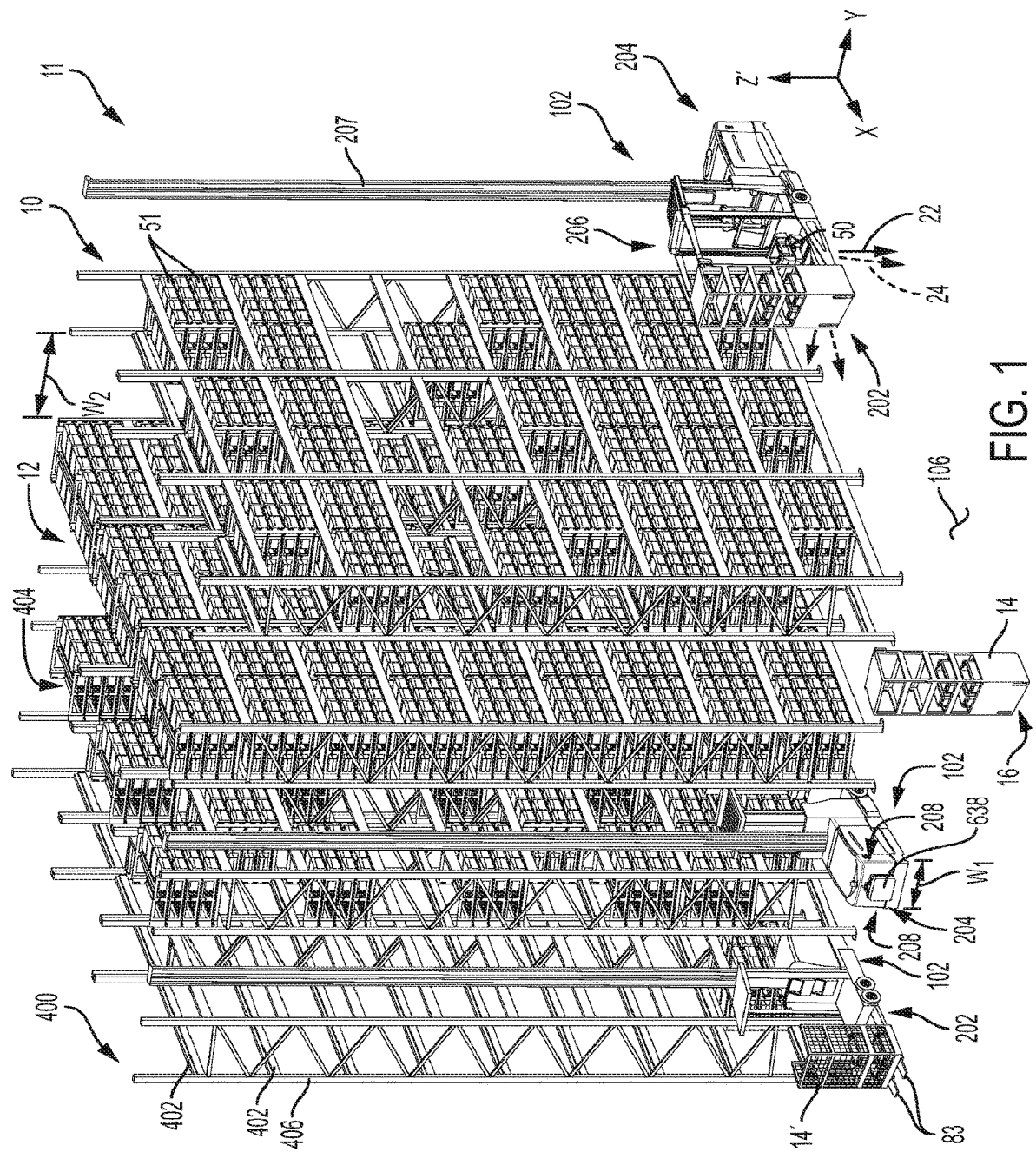
FIG. 1 illustrates a goods storage and retrieval system including a multilevel warehouse racking system, mobile storage carts, a cart home position, and a plurality of materials handling vehicles according to various embodiments shown and described herein.
Figure 10:
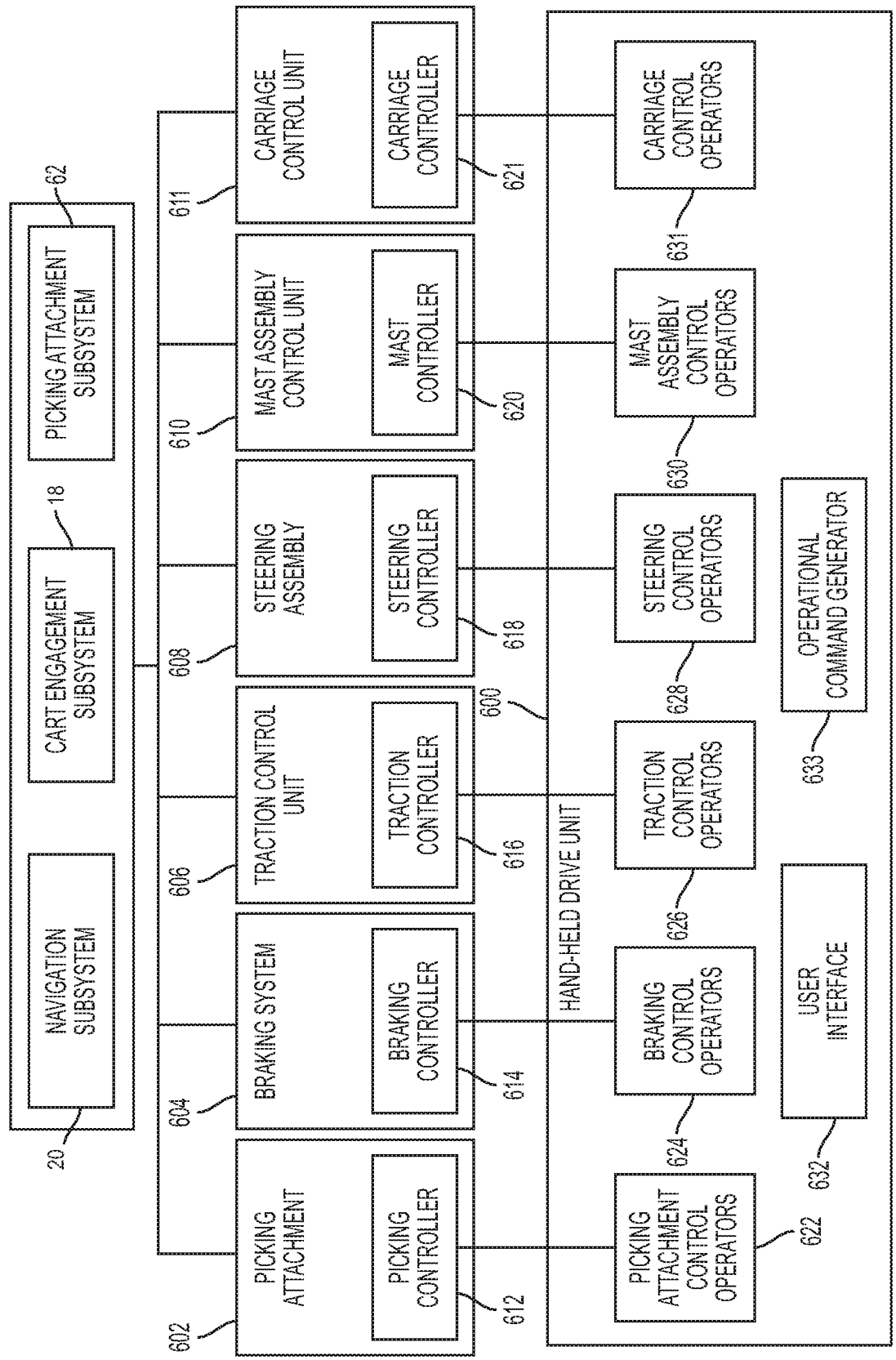
FIG. 10 is a schematic illustration of various controllers of the materials handling vehicle in communication with a hand-held drive unit and vehicle subsystems according to various embodiments shown and described herein.

Referring initially to FIG. 1, a goods storage and retrieval system comprises a multilevel warehouse racking system 12, a mobile storage cart 14, a cart home position 16, and a materials handling vehicle 102 disposed on a vehicle transit surface 106. Referring to FIGS. 1 and 10, the materials handling vehicle 102 comprises a vehicle body 104, a plurality of wheels 210 supporting the vehicle body 104, a traction control unit 606, a braking system 604, and a steering assembly 608, each operatively coupled to one or more of the vehicle wheels 210. The materials handling vehicle 102 further comprises a mast assembly 207, a fork carriage assembly 206 movably coupled to the mast assembly 207, a mast assembly control unit 610, a carriage control unit 611, a picking attachment 602 secured to the fork carriage assembly 206, a cart engagement subsystem 18, a navigation subsystem 20, and one or more vehicular controllers in communication with the traction control unit 606, the braking system 604, the steering assembly 608, the mast assembly control unit 610, the carriage control unit 611, the picking attachment 602, the cart engagement subsystem 18, and the navigation subsystem 20.

Figure 15:
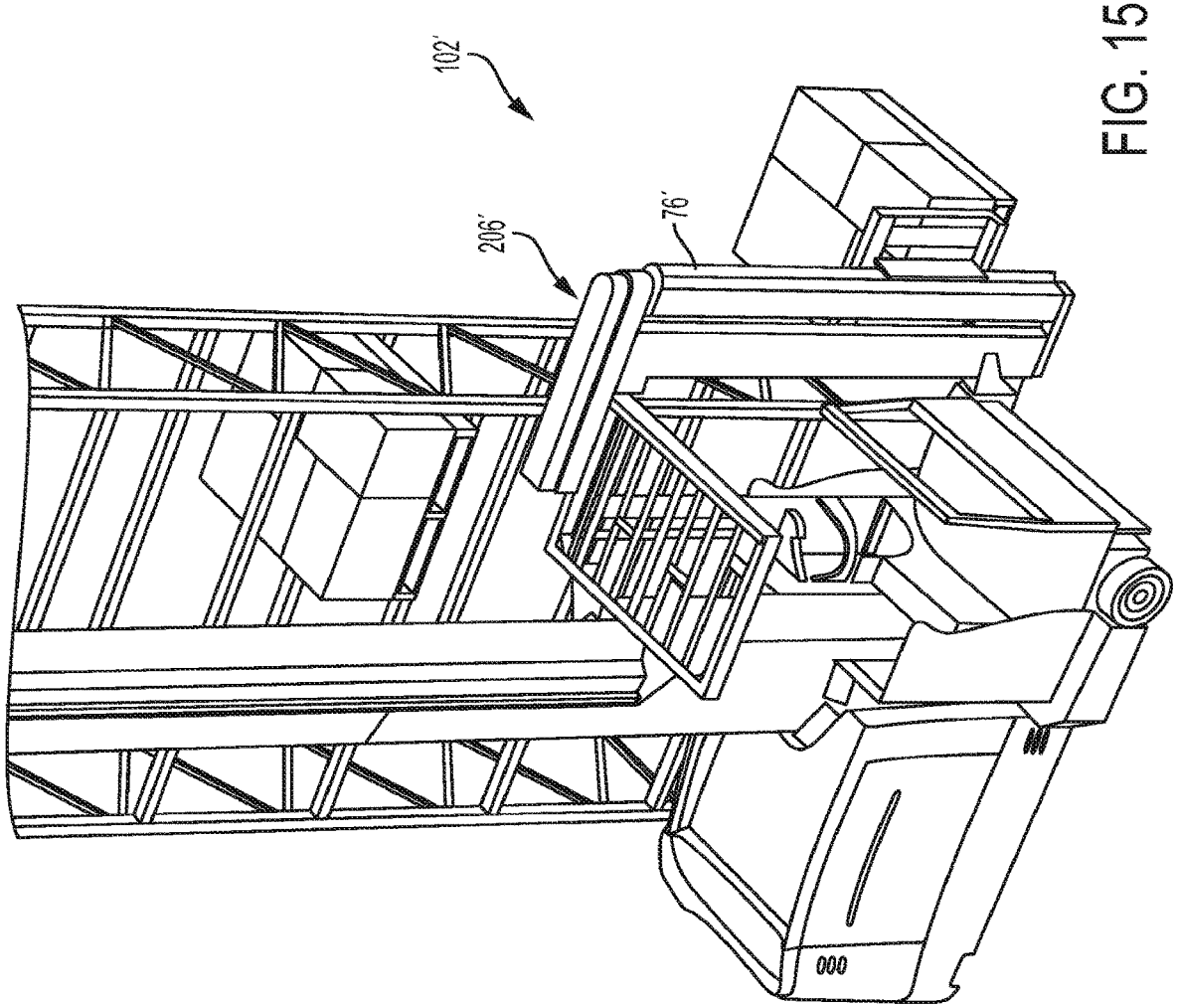
FIG. 15 illustrates another materials handling vehicle according to various embodiments shown and described herein.

While the mast assembly 207 is depicted in FIG. 1 as extending over three times a height of the vehicle body 104, it is understood and within the scope of this disclosure that the mast assembly 207 may extend to different heights with respect to the vehicle body 104. For example, the mast assembly may be extend to about one to one-and-a-half times the height of the vehicle body 104. In addition, alternative embodiments of a materials handling vehicle as describe herein are possible and within the scope of this disclosure, such as a materials handling vehicle 102' depicted in FIG. 15 including an alternative fork carriage assembly 206' and post 76' to which the picking attachment 602, described in greater detail further below, may be attached and operated as described herein. The aforementioned materials handling vehicles may include lift trucks available from Crown Equipment Corporation such as, for example, SP Series Order Pickers such as the Crown SP 3500/4500 Series Order Picker and/or TSP Turret Trucks such as one of the TSP 7000 VNA Truck Series as depicted in FIG. 15. The materials handling vehicles may incorporate automated guidance vehicle ("AGV") functionality using, for example, wire guidance or other guidance features for AGV positioning system functionality.

The cart engagement subsystem 18, which is illustrated schematically in FIG. 10, is characterized by a cart engagement field of view 22, which may be defined by a vision system 40 within the cart engagement subsystem 18. The vehicular controller(s) of the materials handling vehicle 102 execute vehicle functions to: (i) use the navigation subsystem 20 to navigate the materials handling vehicle 102 along the vehicle transit surface 106 to a localized engagement position where the cart home position 16 is within the cart engagement field of view 22, and (ii) use the cart engagement subsystem 18 to engage the mobile storage cart 14 in the cart home position 16 with the fork carriage assembly 206.

More specifically, the cart engagement subsystem 18 may be operatively coupled to at least one of the traction control unit 606, the braking system 604, the steering assembly 608, the mast assembly control unit 610, the carriage control unit 611, and the picking attachment 602 to facilitate cart engagement. The cart engagement subsystem 18 may be coupled to these components directly, or indirectly, through the vehicular controller(s). The cart engagement subsystem 18 may be further characterized by a close approach field of view 24 that is more restricted than the cart engagement field of view 22 defined by the vision system 40. The cart engagement subsystem 18 may transition from an initial approach mode in the cart engagement field of view 22 to a close approach mode in the close approach field of view 24 as the cart home position 16 moves into the close approach field of view 24.

In embodiments, the cart engagement subsystem 18 may comprise a time-of-flight (TOF) system 26 characterized by the close approach field of view 24 and the close approach mode may rely primarily on the TOF system 26 when the cart home position 16 moves into the close approach field of view 24. The cart engagement subsystem 18 is configured to generate a target TOF depth map of the mobile storage cart 14. Further, the vehicular controller(s) of the materials handling vehicle 102 may execute vehicle functions to (i) use the cart engagement subsystem 18 to generate the target TOF depth map of the mobile storage cart 14 in the cart home position 16, and (ii) use the cart engagement subsystem 18 to determine a range position of the mobile storage cart 14 with respect to the cart engagement subsystem 18 based on the target TOF depth map.

In embodiments, the close approach field of view 24 defined by the TOF system 26 is more restricted than the cart engagement field of view 22 defined by the vision system 40. and the cart engagement subsystem 18 may transition from cart engagement operations that rely primarily on the vision system 40 to cart engagement operations that rely primarily on the TOF system 26 as the cart home position 16 moves into the close approach field of view 24.

The navigation subsystem 20 may comprise one or more environmental sensors and an environmental database. In embodiments, the environmental sensors are configured to capture data indicative of a position of the materials handling vehicle 102 relative to the multilevel warehouse racking system 12, the vehicle transit surface 106, or both. Further, the environmental database may comprise stored data indicative of the multilevel warehouse racking system 12, the vehicle transit surface 106, or both. The navigation subsystem 20 may be configured to enable at least partially automated navigation of the materials handling vehicle 102 along the vehicle transit surface 106 utilizing the captured data and the stored data. For example, and not by way of limitation, it is contemplated that the navigation subsystem 20 may utilize a stored warehouse map and captured images of ceiling lights or sky lights to enable navigation, as is disclosed in U.S. Pat. No. 9,174,830 issued on Nov. 3, 2015, U.S. Pat. No. 9,340,399 issued on May 17, 2016, and other similar patents and patent publications. Additional suitable environmental sensors include, but are not limited to, inertial sensors, lasers, antennae for reading RFID tags, buried wires, WiFi signals, or radio signals, global positioning system (GPS) sensors, global navigation satellite system (GNSS) sensors, or combinations thereof.

In embodiments, a warehouse map 30 is stored in a memory that is communicatively coupled to the vehicular controller(s). The vehicular controller(s) of the materials handling vehicle 102 may execute vehicle functions to use the navigation subsystem 20 to determine a localized position of the materials handling vehicle 102 with respect to the vehicle transit surface 106 of a warehouse 11 based on a position of the materials handling vehicle 102 in the warehouse 11 in comparison with the warehouse map 30. The vehicular controller(s) of the materials handling vehicle 102 may further execute vehicle functions to use the navigation subsystem 20 to track navigation of the materials handling vehicle 102 along the vehicle transit surface 106 based on the localized position, navigate the materials handling vehicle 102 along the vehicle transit surface 106 in at least a partially automated manner, or both.

The navigation subsystem 20 may be operatively coupled to at least one of the traction control unit 606, the braking system 604, the steering assembly 608, the mast assembly control unit 610, the carriage control unit 611, and the picking attachment 602 to facilitate cart engagement. Further, the navigation subsystem 20 may be coupled to these components directly, or indirectly, through the vehicular controller(s).

Figure 2:
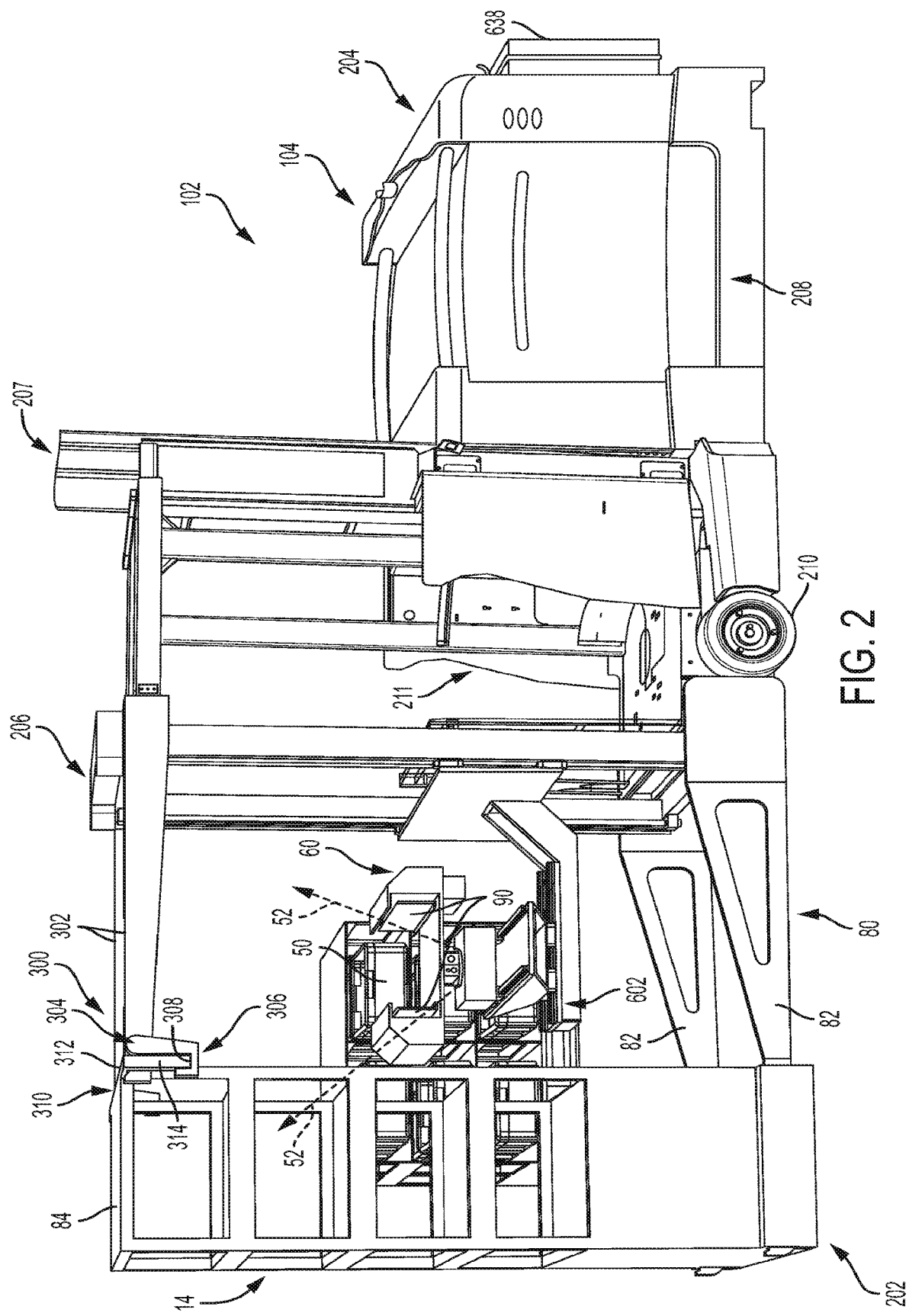
FIG. 2 illustrates a materials handling vehicle including, inter alia, a drive unit case housing a removable hand-held drive unit, a mobile storage cart with an anti-rock cart engagement mechanism and mobile storage cart support platform, and a picking attachment in position to engage a target tote according to various embodiments shown and described herein.

Referring further to FIG. 2, the picking attachment 602 may comprise an X-Y-Z-Ψ positioner 60 and the vehicular controller(s) of the materials handling vehicle 102 may execute vehicle functions to use the X-Y-Z-Ψ positioner 60 of the picking attachment 602 to engage and disengage a target tote 50 positioned in the multilevel warehouse racking system 12 with the picking attachment 602.

Figure 3:
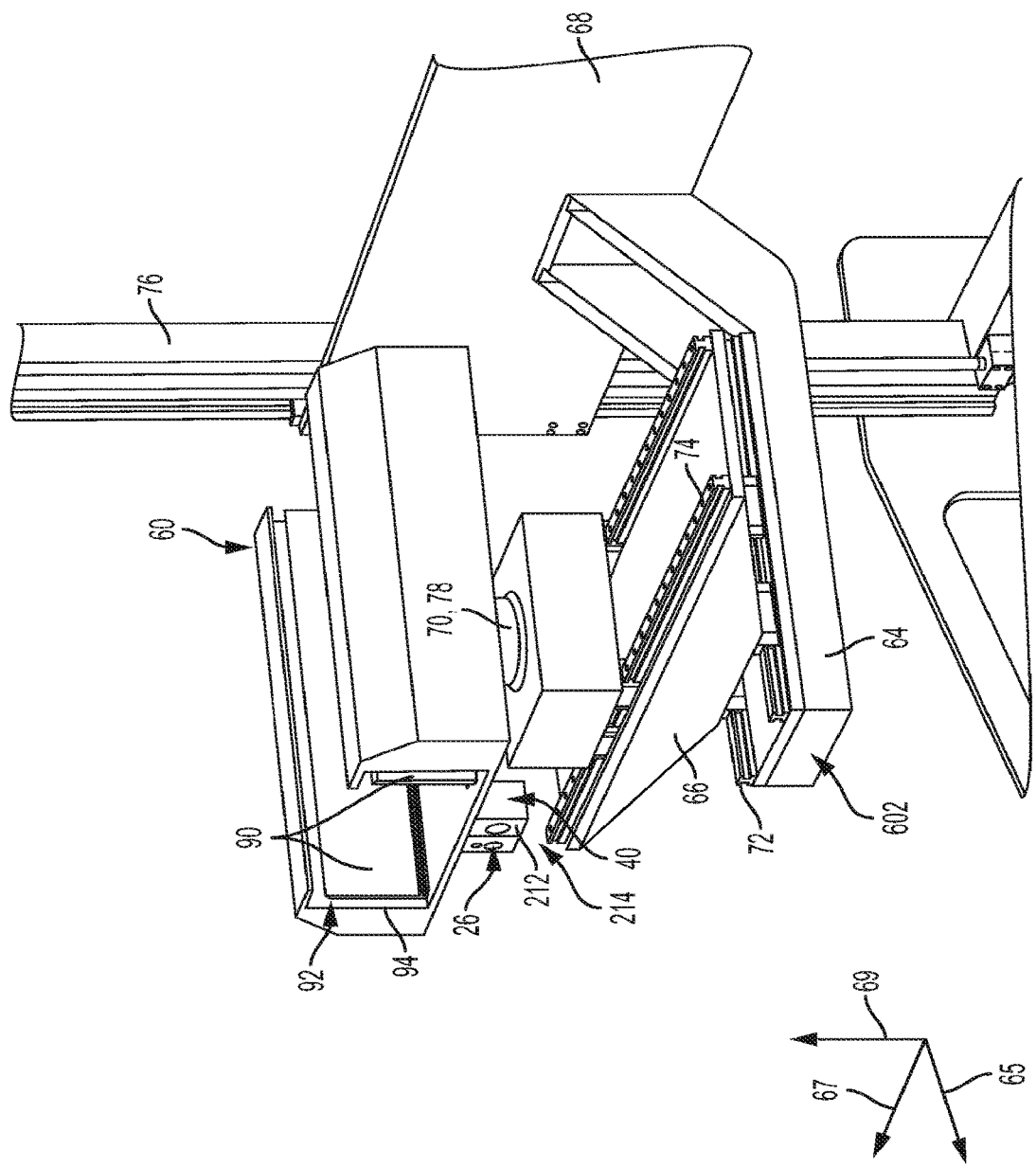
FIG. 3 illustrates the picking attachment of FIG. 2.

As illustrated in FIG. 3, the X-Y-Z-Ψ positioner 60 may comprise an X-positioner 64 configured to move the picking attachment in a first degree of freedom along a first lateral axis 65 in a lateral plane, a Y-positioner 66 configured to move the picking attachment in a second degree of freedom along a second lateral axis 67 perpendicular to the first lateral axis 65 in the lateral plane, a Z-positioner 68 configured to move the picking attachment in a third degree of freedom along a Z-axis 69 perpendicular to the first lateral axis 65 and the second lateral axis 67, and a rotational Ψ-positioner 70 configured to rotate the picking attachment 602 in a fourth degree of freedom about the Z-axis 69. The X-positioner 64 may comprise rails 72 configured to permit movement of the picking attachment 602 along the first lateral axis 65. The Y-positioner 66 may comprise rails 74 configured to permit movement of the picking attachment 602 along the second lateral axis 67. The Z-positioner 68 may comprise a vertical displacement mechanism configured to slidably engage with a post 76 of the fork carriage assembly 206 for vertical displacement with respect to the fork carriage assembly 206. The rotational Ψ-positioner 70 may comprise a shaft 78 configured to permit rotation of the picking attachment 602 about the Z-axis 69. Such "rails" may include mechanical engagement components such as one or more tracks fixed on an upright support, each including an engagement mechanism configured to engage with a corresponding engagement mechanism of a respective positioner for a sliding engagement. For example, an engagement mechanism of a rail may be one of a notch or a protrusion configured to slidably engage with the notch, and the corresponding engagement mechanism may be the other of the notch or the protrusion. As a non-limiting example, the tracks may be bars made of metal such as stainless steel or a like suitable material understood to be within the scope of this disclosure.

The materials handling vehicle 102 may further comprises a picking attachment subsystem 62, which is illustrated schematically in FIG. 10, in communication with the vehicular controller(s) of the materials handling vehicle 102. As is illustrated in FIG. 3, the picking attachment subsystem 62 may comprises the picking attachment 602 (including the X-Y-Z-Ψ positioner 60) and the time-of-flight (TOF) system 26. The picking attachment subsystem 62 is configured to use the TOF system 26 to generate a target TOF depth map of the target tote 50. The vehicular controller(s) of the materials handling vehicle 102 may execute vehicle functions to use the X-Y-Z-Ψ positioner 60 of the picking attachment subsystem 62 to engage the target tote 50 with the picking attachment 602 based on the target TOF depth map. For example, the picking attachment 602 engages the target tote 50 or a target pallet with the aid of a TOF depth map, which is particularly useful for rotational (Ψ) positioning about the Z axis. Rotational adjustments may compensate for target tote rotation or rotational error in the materials handling vehicle 102. The navigation subsystem 20 may be configured to position the materials handling vehicle 102 such that the target tote 50 is within a tote engagement field of view 52 of the TOF system 26.

Figure 4:
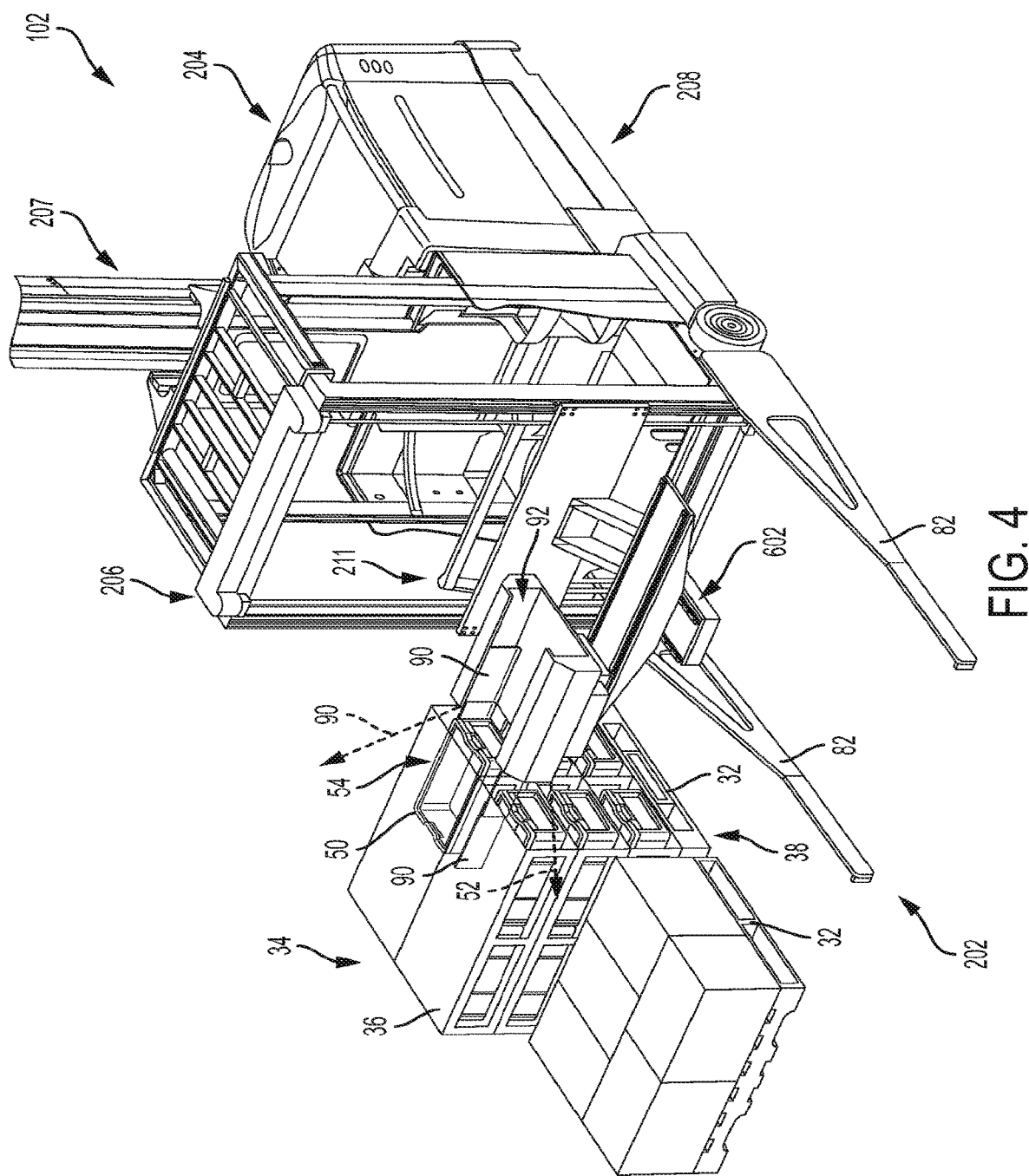
FIG. 4 illustrates the picking attachment and the materials handling vehicle of FIG. 2 in a position in which a slide-out of the picking attachment are in an extended position to either retrieve the target tote from, or store the target tote on, a shelf insert.

The vision system 40 may also be part of the navigation subsystem 20, and the multilevel warehouse racking system 12 may comprises a target fiducial associated with the target tote 50. The navigation subsystem 20 may be configured to position the materials handling vehicle 102 such that the target fiducial is within a field of view of the vision system 40. The navigation subsystem 20 may further be configured to utilize the target fiducial to position the materials handling vehicle 102 such that the target tote 50 is within the tote engagement field 52 of view of the TOF system 26. For example, it is contemplated that suitable target fiducials may include markings or tags on the warehouse racking system, or distinctive elements of the racking system itself. An example is depicted in FIG. 4 with respect to a target fiducial 32 disposed on a rack module such as a shelf unit. Rack modules within the scope of this disclosure may have different numbers of slots to position items such as totes within, and a fiducial such as the target fiducial 32 attached to each rack module may be configured to identify the number of slots per respective module. Once a position of the target fiducial 32 is recorded as an X-Y-Z position on the warehouse map 30, a position of the totes (including, for example, the target tote 50) within the shelf unit will be known as well. The same location may be utilized to pick objects such as a pallets through a materials handling vehicle (such as the materials handling vehicle 102' of FIG. 15) at another time or for manual stock picking. An entire rack module including or empty of one or more totes 49 may be picked as described herein from a storage location such as the shelf unit or a target tote 50 may be individually picked as described herein. A target tote 50 to be picked may not include a target fiducial but may be stored in a storage location such as a shelf unit of FIG. 4 that includes the target fiducial 32 to guide the materials handling vehicle 102 to the localized position of the shelf unit to engage the target tote 50 as described herein. Alternatively, both the racking module, such as the shelf unit, and the target tote 50 may include target fiducials to guide engagement of the target tote 50 with the picking attachment 602 as described herein.

Figure 5:
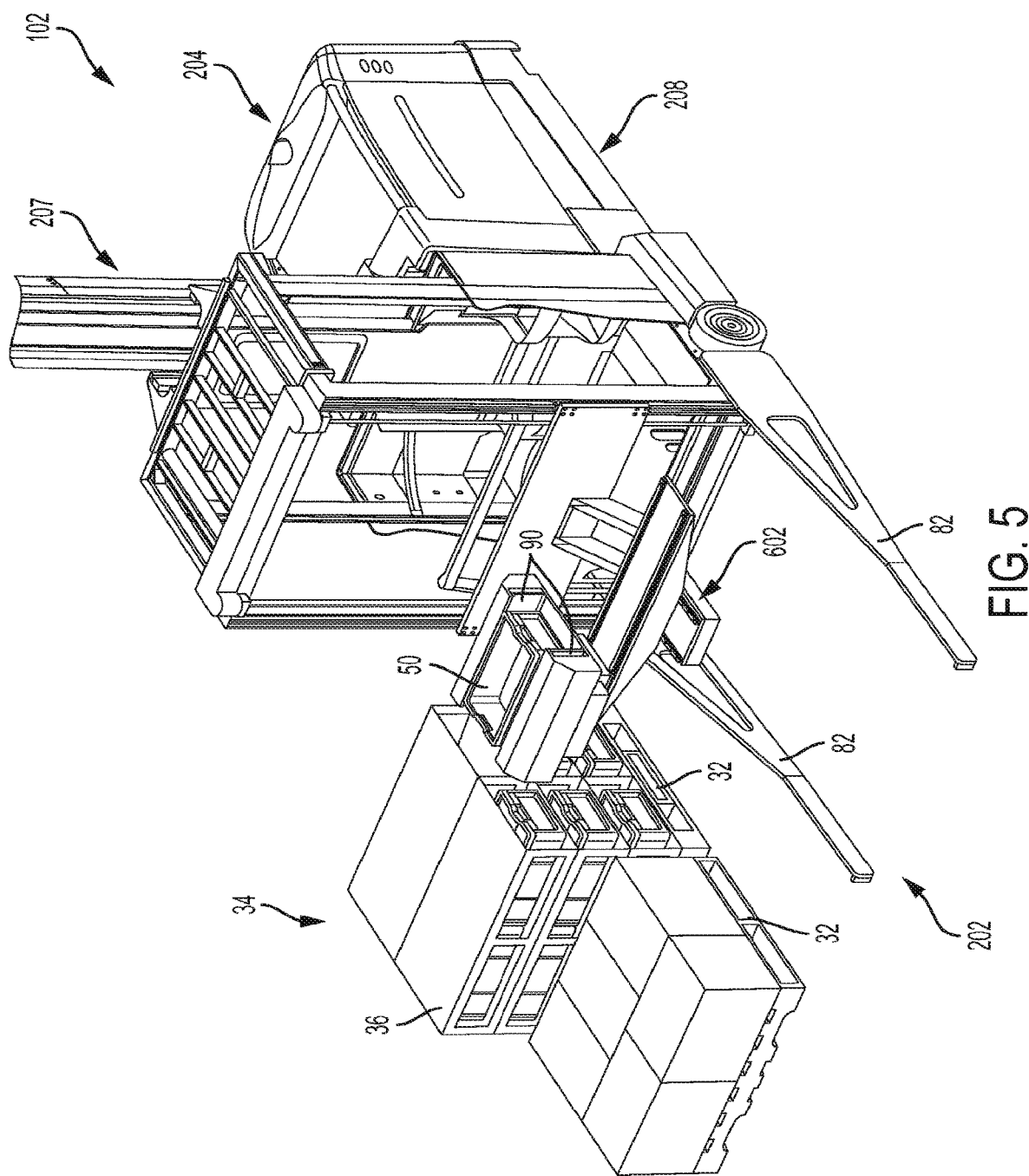
FIG. 5 illustrates the materials handling vehicle of FIG. 2 in a position in which the slide-out have positioned the target tote in the picking attachment in a secured position.
Figure 6:
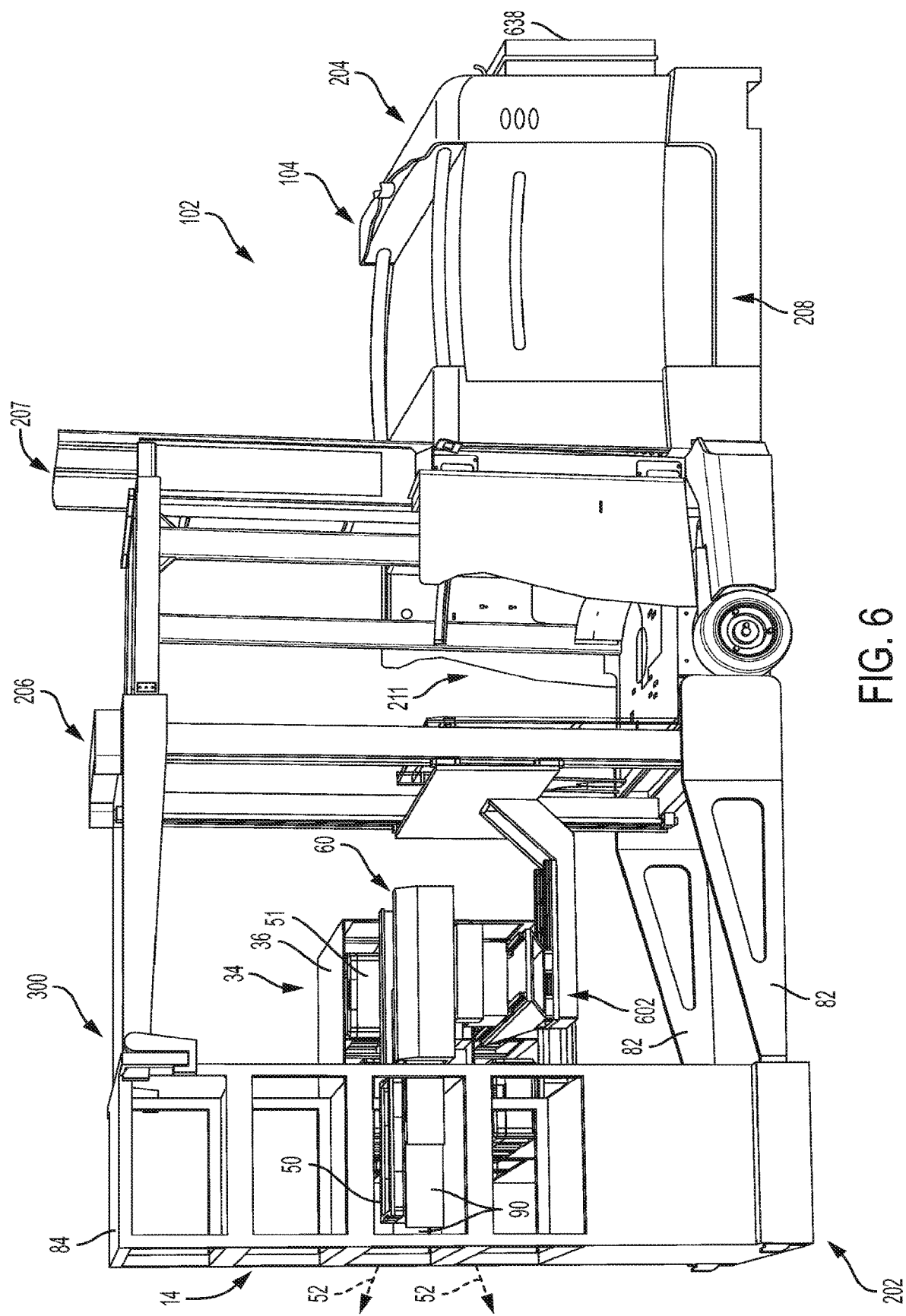
FIG. 6 illustrates the picking attachment and the materials handling vehicle of FIG. 2 in a position in which the picking attachment is in rotational alignment with a shelf of the engaged mobile storage cart and the slide-out are in an extended position to either retrieve the target tote from or store the target tote on the shelf.

With reference to FIGS. 4-6, a picking scheme as described herein may include travel to a tote location 54 of a target tote 50 within a rack module 34 to engage the target tote 50. Another picking scheme may include travel to a rack module 34 within a rack bay 38 of the multilevel warehouse racking system 12 and visualization of a target fiducial 32 of the rack module 34 to pick, based on, for example, known coordinates of the target fiducial 32, the entire rack module 34 or a target tote 50 from within the rack module 34. Further, a picking scheme may include dual target fiducial visualization and include travel to a rack module 34 within a rack bay 38 of the multilevel warehouse racking system 12, visualization of a target fiducial 32 of the rack module 34, movement to a location of a target tote 50 within the visualized rack module 34 based on information received from visualization of that rack module 34, visualization of the target tote 50 within the rack module 34, and engagement of the target tote 50 by the picking attachment 602 as described herein. Thus, the navigation subsystem 20 may be configured to position the materials handling vehicle 102 such that the target fiducial 32 of a shelf unit 36 of the rack module 34 FIG. 4 is within a field of view of the vision system 40. The navigation subsystem 20 may additionally be configured to utilize the target fiducial 32 to position the materials handling vehicle 102 such that the shelf unit 36 is within a rack module field of view of the TOF system 26. The navigation subsystem may further be configured to utilize a target fiducial of the target tote 50 within the rack module field of view to position the materials handling vehicle 102 such that the target tote 50 is within the tote engagement field 52 of view of the TOF system 26.

Figure 7:
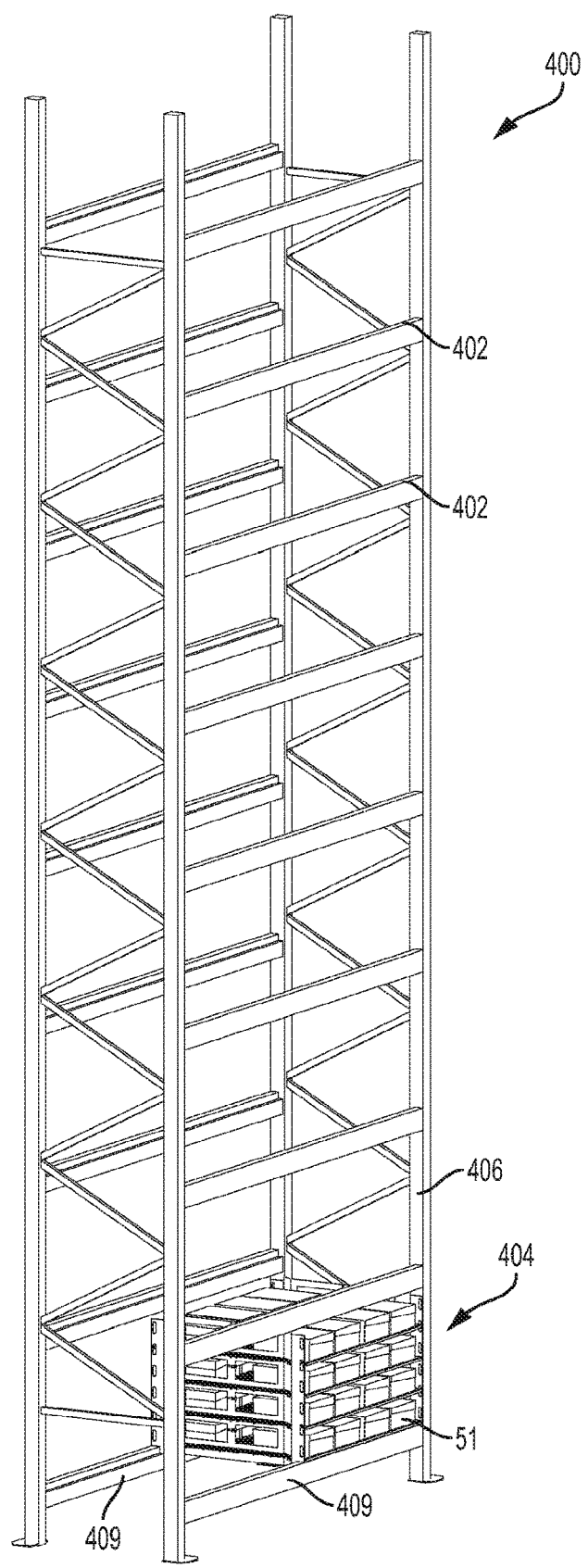
FIG. 7 illustrates a rack of the multilevel warehouse racking system of FIG. 1 in which the rack supports a shelf insert on a bottom shelf, which shelf insert stores a plurality of totes, according to various embodiments shown and described herein.

As illustrated in FIGS. 4 and 5, the target tote 50 may be stored within a rack module 34 such as on a shelf unit 36 of the multilevel warehouse racking system 12. The shelf unit 36 may alternatively be a shelf insert 404 as illustrated in FIG. 7, and which is described in greater detail further below. In FIG. 4, the picking attachment 602 of the materials handling vehicle 102 of FIG. 2 is in a position in which a slide-out 90 of the picking attachment 602 are in an extended position to either retrieve the target tote 50 from or store the target tote 50 on the shelf unit 36. In FIG. 5, the materials handling vehicle 102 of FIG. 2 is in a position in which the slide-out 90 has positioned the target tote 50 in the picking attachment 602 in a secured position. In FIG. 6, the materials handling vehicle 102 of FIG. 2 is in a position in which the picking attachment 602 is in rotational alignment, through a rotation as described in greater detail below, with a shelf of the engaged mobile storage cart 14, and the slide-out 90 is in an extended position to either retrieve the target tote 50 from or store the target tote 50 on the shelf of the engaged mobile storage cart 14.

Figure 13:
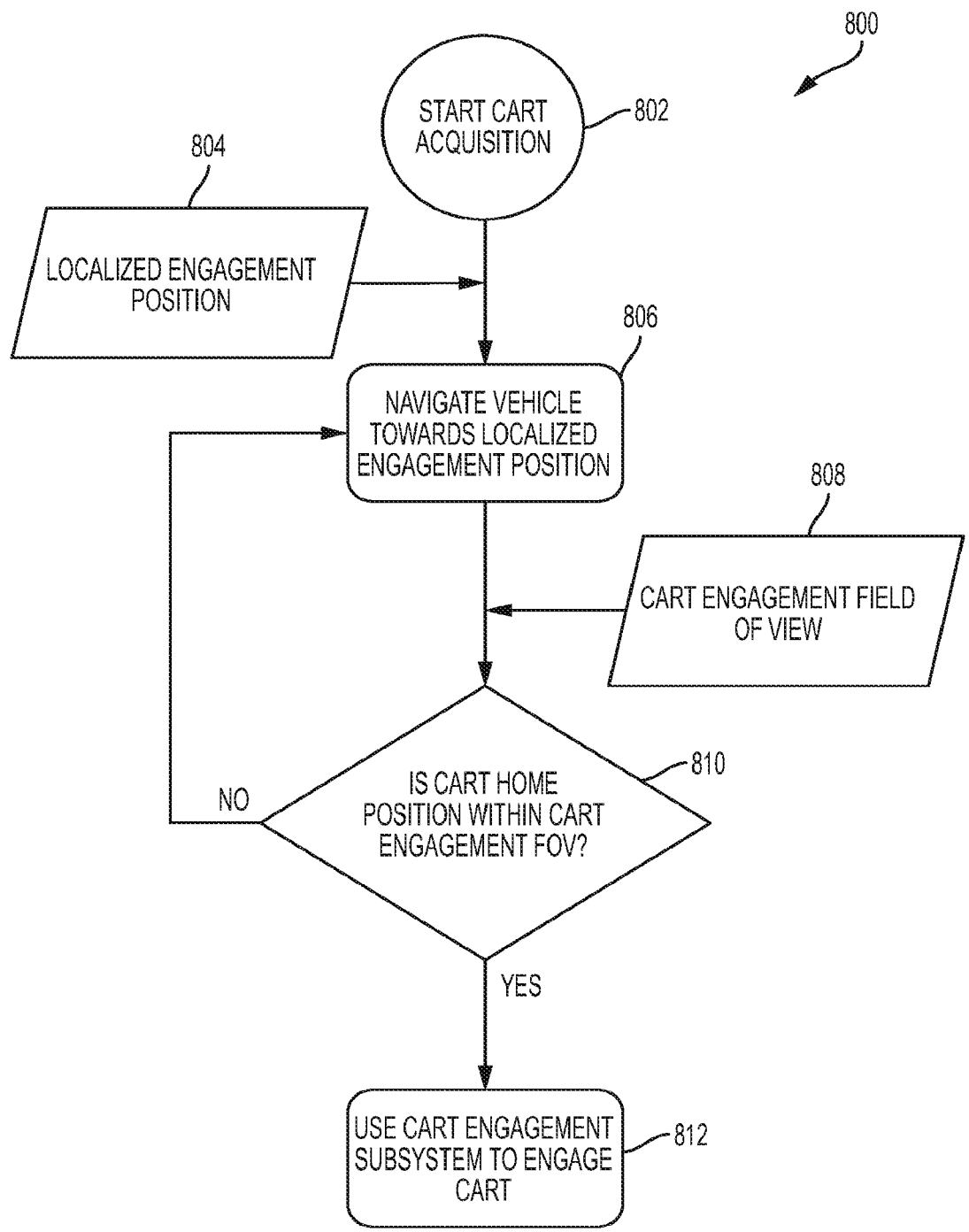
FIG. 13 is a flow chart illustrating cart acquisition methodology according to various embodiments shown and described herein.

A method 800 of operating the goods storage and retrieval system 10 according to one embodiment of the present disclosure is illustrated in FIG. 13 and may be read in light of the system components of FIGS. 1 and 10. As illustrated in FIG. 13, the method 800 includes a step 802 to start cart acquisition followed by a step 804 to receive information regarding a localized engagement position of the cart home position 16. The method further includes, in step 806, and through use of the navigation subsystem 20 and the vehicular controller(s), navigating the materials handling vehicle 102 along the vehicle transit surface 106 to a localized engagement position and receiving information from the cart engagement field of view in step 808. If in step 810 the cart home position 16 is not within the cart engagement field of view 22, the method 800 returns to step 806. Otherwise, if in step 810 the cart home position 16 is within the cart engagement field of view 22, the method 800 continues on to step 810 and uses the cart engagement subsystem 18 to engage the mobile storage cart 14 by engaging the mobile storage cart 14 in the cart home position 16 with the fork carriage assembly 206.

Figure 14:
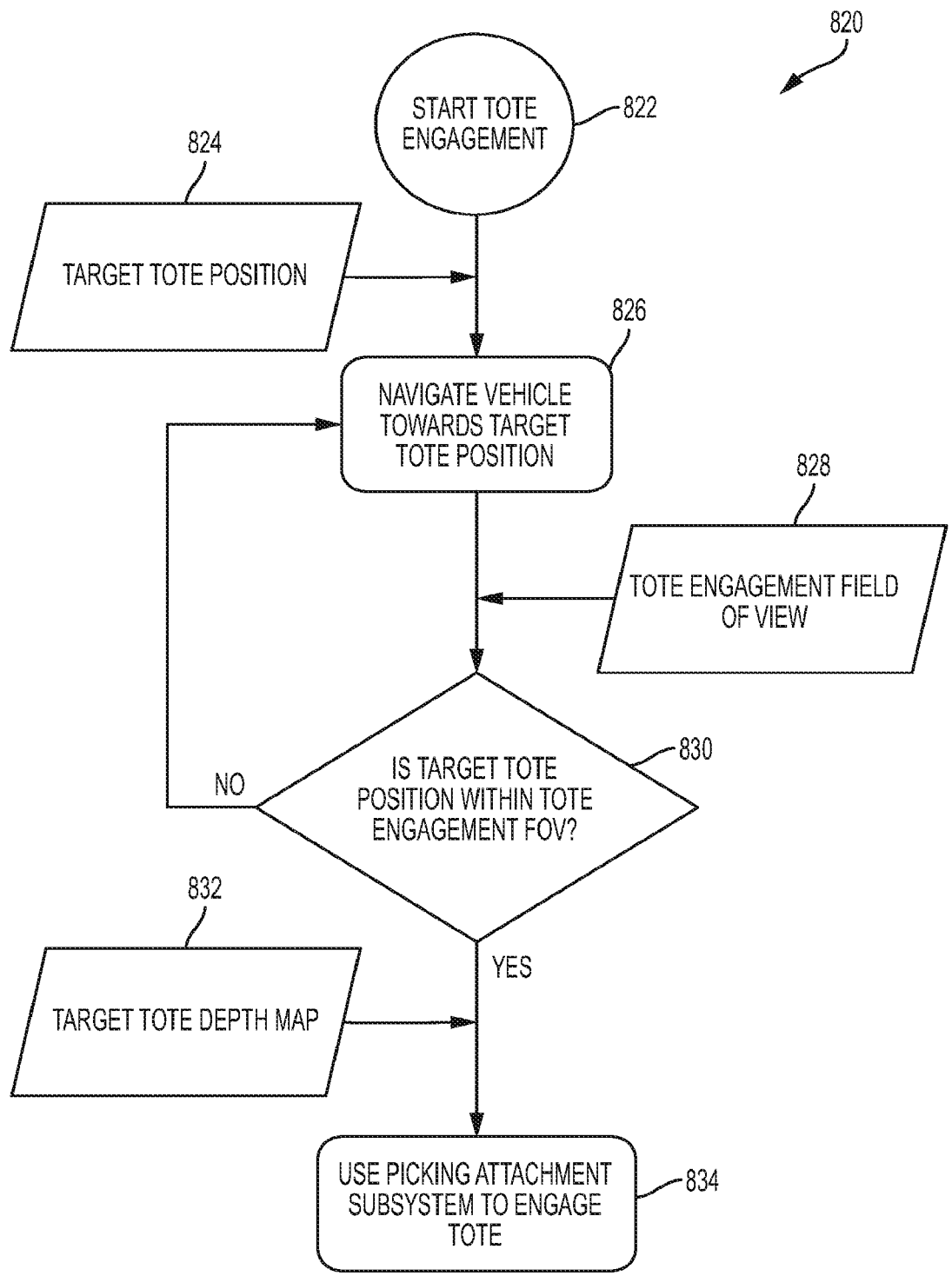
FIG. 14 is a flow chart illustrating tote engagement methodology according to various embodiments shown and described herein.

In embodiments, a method 820 of operating the goods storage and retrieval system 10 may include, as illustrated in FIG. 14, a step 822 to start tote engagement followed by a step 824 to receive information regarding a target tote position of a target tote 50. The method 820 further includes, in step 826, and through use of at least one of the navigation subsystem 20, the picking attachment subsystem 62, and the vehicular controller(s), navigation the materials handling vehicle 102 toward the target tote position and aligning the picking attachment 602 with the target tote 50. In step 828, information is received from the tote engagement field of view 52. If in step 830 the target tote position is not within the tote engagement field of view 52, the method 820 returns to step 826. Otherwise, if in step 830 the target tote position is within the tote engagement field of view 52, the method 820 continues on to step 832 to generate a target tote depth map and, in step 834, to use the picking attachment subsystem 62 to the engage the target tote 50 based on the target tote depth map.

With either or a combination of the methods 800 or 820, a velocity number may be assigned to a stock keeping unit (SKU) associated with a target tote 50 in the multilevel warehouse racking system 12 based on an order velocity indicative of a frequency of usage parameter associated with the target tote 50. A relatively high velocity number may be associated with a low storage position on a low shelf of the multilevel warehouse racking system 12, and a relatively low velocity number may be associated with a high storage position on a high shelf of the multilevel warehouse racking system 12. For example, a lowest velocity number may be associated with a highest shelf, and a highest velocity number may be associated with a lowest shelf.

Further, the picking attachment 602 and the fork carriage assembly 206 may be used to move the target tote 50 from a portion of the multilevel warehouse racking system 12 associated with a relatively low velocity number to a portion of the multilevel warehouse racking system 12 associated with a relatively high velocity number based on an increase in the order velocity with respect to the target tote 50. Further, the picking attachment 602 and the fork carriage assembly 206 may be used to move the target tote 50 from a portion of the multilevel warehouse racking system 12 associated with a relatively high velocity number to a portion of the multilevel warehouse racking system 12 associated with a relatively low velocity number based on a decrease in the order velocity with respect to the target tote 50.

In embodiments, a first target tote may be engaged at a first storage position on a high shelf associated with a relatively low velocity number with the picking attachment 602. The first target tote may be placed with the picking attachment 602 in the mobile storage cart 14 engaged by the fork carriage assembly 206. Further, the materials handling vehicle 102 may be navigated to a second target tote when the second target tote is assigned a relatively high velocity number and is within a close distance to the first storage position. The second target tote may be engaged with the picking attachment 602, which may lower the second target tote to a low shelf associated with the relatively high velocity number or place the second target tote in the mobile storage cart 14. For example, the materials handling vehicle 102 may be navigated to a subsequent pick location when the second target tote is placed in the mobile storage cart 14, and the second target tote may be placed on the low shelf associated with the relatively high velocity number while at the subsequent pick location.

In other embodiments, a first target tote may be engaged at a storage first position on a low shelf associated with the high velocity number with the picking attachment 602, and the picking attachment 602 may place the first target tote in the mobile storage cart 14 engaged by the fork carriage assembly 206. Further, the materials handling vehicle 102 may be navigated to a second target tote when the second target tote is assigned a relatively low velocity number and is within a close distance to the first position on the low shelf to engage the second target tote with the picking attachment 602 and either raise the second target tote to a high shelf associated with the relatively low velocity number or place the second target tote in the mobile storage cart 14. For example, the materials handling vehicle 102 may be navigated to a subsequent pick location when the second target tote is placed in the mobile storage cart 14, and the picking attachment 602 places the second target tote on the high shelf associated with the relatively low velocity number while at the subsequent pick location.

In embodiments, positioning the materials handling vehicle 102 may be positioned in a first aisle of the multilevel warehouse racking system 12, and one or more target totes 50 may be placed with the picking attachment 602 in the mobile storage cart 14 engaged by the fork carriage assembly 206. Further, the mobile storage cart 14 may be used as a temporary storage location to level inventory when one or more inventory orders are received such that the one or more target totes 50 are shuffled between the mobile storage cart 14 and a plurality of shelves of the multilevel warehouse racking system 12 based on a respective order velocity indicative of a frequency of usage parameter associated with each target tote 50 to optimize a usage parameter with respect to the first aisle. Advantages from such inventory leveling may include fewer trips by the materials handling vehicle 102 back and forth through an aisle and more picks and puts per distance traveled by the picking attachment 602 of the materials handling vehicle 102 to lower a cost per pick. It is contemplated that such an inventory leveling system may work in conjunction with a warehouse management system to control product flow and optimize pick and replenishment and to organize products based on an average or known velocity based on product demand.

With such an inventory leveling system, a relatively low velocity number associated with a high shelf of the multilevel warehouse racking system 12 may be assigned to a SKU associated with a first target tote that is stored in the mobile storage cart 14, and a relatively high velocity number associated with a low shelf of the multilevel warehouse racking system 12 may be assigned to a SKU associated with a second target tote stored on a high shelf of the multilevel warehouse racking system 12. Information may be received indicative of the second target tote being stored on the high shelf. The materials handling vehicle 102 may be navigated to a location of the multilevel warehouse racking system 12 associated with the high shelf during an off-peak picking time or an off shift time, and the mobile storage cart 14 engaged by the fork carriage assembly 206 may be moved to the high shelf. Once in position, the picking attachment 602 may exchange the first target tote stored in the mobile storage cart 14 with the second target tote stored on the high shelf to store the second target tote in the mobile storage cart 14. Such an exchange is to level inventory and reduce the amount of fork carriage assembly raising and lowering needed to retrieve target totes 50. This would be particularly significant during, for example, peak periods or high volume shifts because it would reduce the time needed to fulfill an inventory order and the energy expended by the materials handling vehicle 102.

In embodiments, one or more target totes 50 may be placed with the picking attachment 602 in the mobile storage cart 14 engaged by the fork carriage assembly 206 such that the mobile storage cart 14 is utilized as a temporary storage location. The picking attachment pick and place operations may be interleaved by picking up and placing away multiple target totes 50 during a single trip of the materials handling vehicle 102 down an aisle of the multilevel warehouse racking system 12.

The first aisle may comprise a very narrow aisle (VNA). Further, use of the mobile storage cart 14 as a temporary storage location allows for multiple picks to be made in the aisle or while the fork carriage assembly 206 is raised to a high storage location to minimize energy used to raise and lower the fork carriage assembly 206. The mobile storage cart 14 may also be used to fill multiple inventory order in a batch and deliver the entire batch to a location or to a transfer node for delivery to another location.

A first target tote may be stored on a shelf of a plurality of shelves in the first aisle of the multilevel warehouse racking system 12, and a second target tote may be stored in the mobile storage cart 14. The first target tote on the shelf in a shelf location may be engaged by the picking attachment 602 to pick up the first target tote with the picking attachment 602, which may remove the first target tote from the shelf location and place the first target tote on a shelf of the mobile storage cart 14. The picking attachment 602 may engage the second target tote stored in the mobile storage cart 14, remove the second target tote from the mobile storage cart 14, and place the second target tote in the shelf location to place away the second target tote.

The picking attachment 602 may be added as a vehicle retrofit such that the picking attachment 602 and materials handling vehicle 102 collectively define dual axis vertical displacement. More specifically, as a non-limiting example, the mast assembly 207 and the mast assembly control unit 610 may be configured to move the fork carriage assembly 206 along a vertical axis Z', and the picking attachment 602, which comprises the X-Y-Z-$\Psi$ positioner 60, may be secured to the fork carriage assembly 206. The vehicular controller(s) of the materials handling vehicle 102 executes vehicle functions to use the X-Y-Z-$\Psi$ positioner 60 of the picking attachment 602 to engage and disengage a target tote 50 positioned in the multilevel warehouse racking system 12 with the picking attachment 602. The mast assembly 207, mast assembly control unit 610, and the picking attachment 602 are collectively configured such that movement of the picking attachment 602 along the Z-axis 69 by the X-Y-Z-$\Psi$ positioner 60 is independent of movement of the fork carriage assembly 206 along the vertical axis Z' by the mast assembly 207 and mast assembly control unit 610. It is noted that "independent" movement means that the X-Y-Z-$\Psi$ positioner 60 can effectuate vertical displacement without relying on movement of the fork carriage assembly 206 along the vertical axis Z'.

In embodiments, the mast assembly 207, mast assembly control unit 610, and the picking attachment 602 are collectively configured such that movement of the picking attachment 602 along the Z-axis 69 by the X-Y-Z-Ψ positioner 60 is supplemented by movement of the fork carriage assembly 206 along the vertical axis Z' by the mast assembly 207 and mast assembly control unit 610. "Supplemental" movement contemplates that, since the picking attachment 602 is secured to the fork carriage assembly 206, movement of the picking attachment 602 along the Z-axis 69 by the X-Y-Z-Ψ positioner 60 can also result from movement of the fork carriage assembly 206 (for example, with respect to the mast assembly 207) along the vertical axis Z'.

Referring to FIGS. 3-6, the picking attachment 602 may comprise a slide-out 90 that is configured to extend and retract to engage the target tote 50. The slide-out 90, which may be a telescoping assembly, is provided with hardware that selectively engages the target tote to push and pull the target tote into, and out of, a warehouse shelf in a sliding motion. For example, and not by way of limitation, the slide-out 90 may be provided with pivoting engagement fingers that pivot into and out of a sliding path of a target tote for tote engagement. The slide-out 90 may be configured to slide within slots 92 defined in a pair of inner side walls 94 of the picking attachment 602. In embodiments, the picking attachment 602 may comprise a mechanism configured to grip the target tote 50 such as, for example, at least one of a claw, a gripper, one or more vacuum cups, electromagnetic coils, an articulating arm, and the like, as described in U.S. Prov. App. No. 62/340,513, which has previously been incorporated herein in its entirety.

Referring again to FIG. 2, the fork carriage assembly 206 may comprise a mobile storage cart support platform 80 defined by one or more cart lifting forks 82 and an anti-rock cart engagement mechanism 300. The vehicular controller(s) may be in communication with the cart engagement subsystem 18 and may execute vehicle functions to use the cart engagement subsystem 18 to engage a mobile storage cart 14 supported by the cart lifting forks 82 with the one or more cart lifting forks 82 and the anti-rock cart engagement mechanism 300 of the fork carriage assembly 206. The anti-rock cart engagement mechanism 300 may comprise a pair of support arms 302 configured to engage a pair of support arm engagement features 304 disposed at and extending from a top end 84 of a mobile storage cart 14 supported by the cart lifting forks 82. Each support arm 302 may include a hook 306 defining a notch 308 and downwardly extending from a distal portion 310 of the support arm 302. Further, each support arm engagement feature 304 may include a horizontal lip 312 and a vertical prong 314. The horizontal lip 312 is configured to be supported on the distal portion 310 of the support arm 302, and the vertical prong 314 is configured to be received and supported by the notch 308 in the hook 306. In embodiments, the anti-rock cart engagement mechanism 300 is configured to engage the mobile storage cart 14. In another embodiment, the anti-rock cart engagement mechanism 300 is configured to engage the mobile storage cart 14 supported by the cart lifting forks 82. By way of example and not as a limitation, the anti-rock cart engagement mechanism 300 is configured to engage the mobile storage cart 14 supported by the cart lifting forks 82 at a cart contact point that is vertically displaced from the mobile storage cart support platform 80 by a distance approximating a height of the mobile storage cart 14. In another embodiment, the anti-rock cart engagement mechanism 300 may be configured to engage the mobile storage cart 14 supported by the cart lifting forks 82 at a pair of cart contact points that are vertically displaced from the mobile storage cart support platform 80 by a distance approximating a height of the mobile storage cart 14.

In other embodiments, as illustrated in FIG. 1, fork tines 83 may be used instead of the cart lifting forks 82. The fork tines 83 are configured to engage with a mobile storage cart 14' that has a slightly different construction than the mobile storage cart 14. A pallet clamp, as known in the art, is used to releasably secure the mobile storage cart 14' to the materials handling vehicle 102. For example, a top end of the mobile storage cart 14' is open rather than closed as shown with respect to the mobile storage cart 14. Further, sides of the shelving for the mobile storage cart 14' are not configured to face the materials handling vehicle 102 when engaged by the materials handling vehicle 102 and may be covered by, for example, a wired grid or mesh insert, while sides of the shelving for the mobile storage cart 14 are shown as open. It should be understood that different suitable variations of these mobile storages carts to be engaged with either the cart lifting forks 82 or the fork tines 83 are within the scope of this disclosure. For example, the mobile storage cart 14 may also include a wired grid, plexiglass, or mesh insert along sides of shelving not configured to face the materials handling vehicle 102 when engaged.

Figure 8:
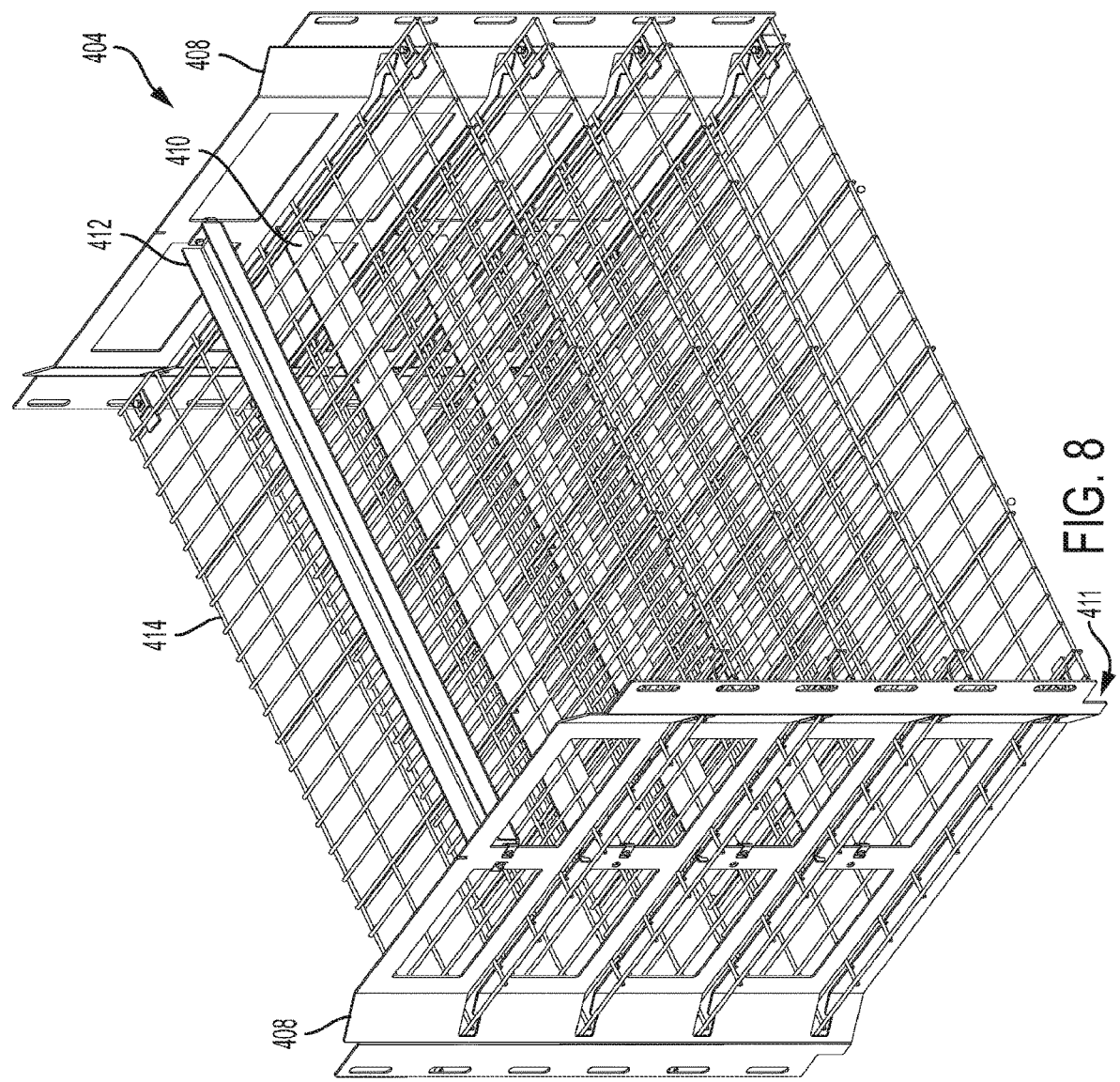
FIG. 8 illustrates the shelf insert of FIG. 7 without the plurality of totes.
Figure 9:
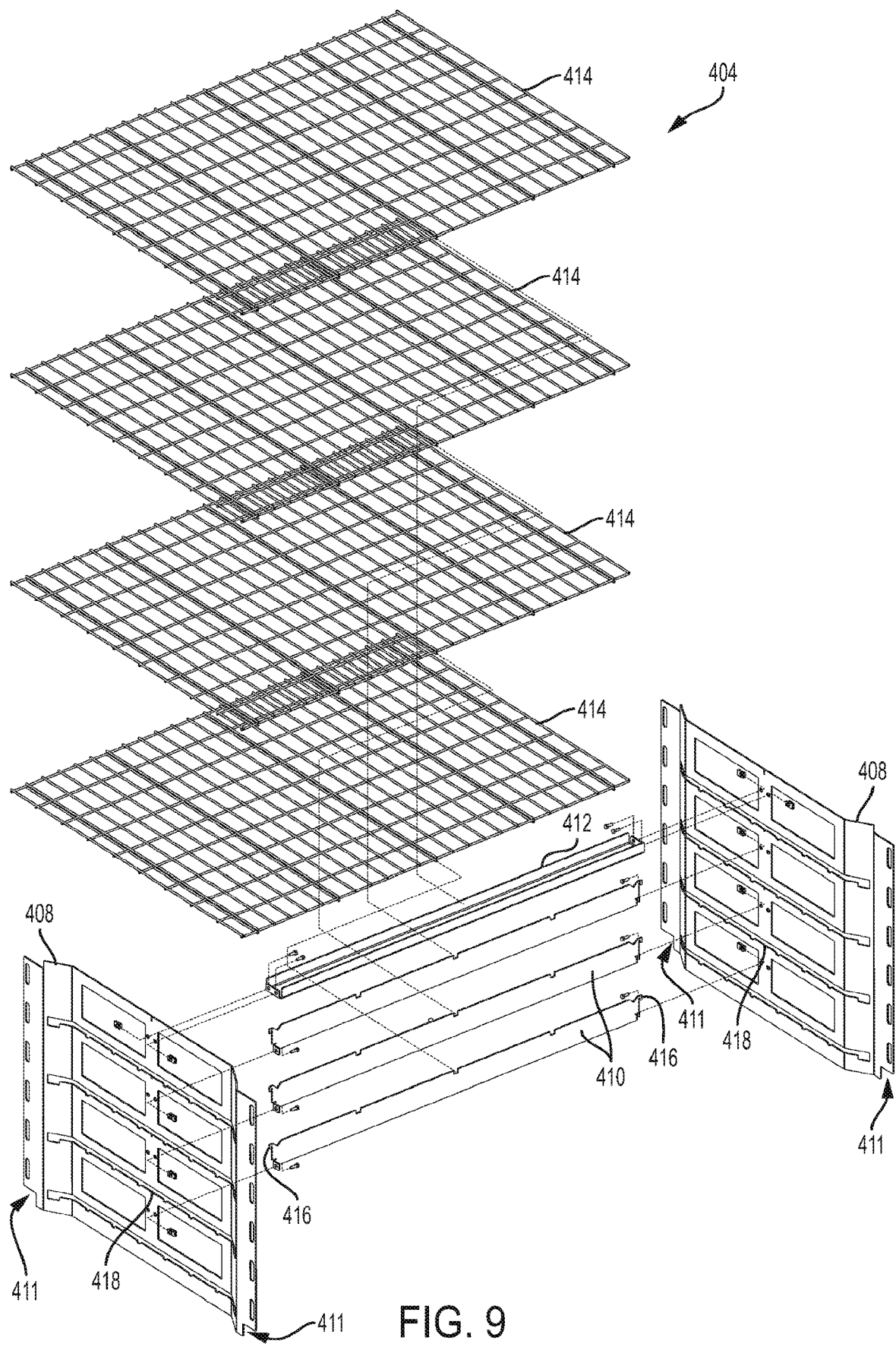
FIG. 9 illustrates an exploded view of the shelf insert of FIG. 8.

FIG. 7 illustrates an embodiment of a rack 400 of the multilevel warehouse racking system 12 having a plurality of shelves having at least a portion configured to support a shelf insert 404 configured to store one or more totes 51. As a non-limiting example, the shelf insert 404 may be configured to adjoin at least one of an upright rail 406 of the rack 400 and another shelf insert 404 positioned in the rack 400. Further, as illustrated in FIGS. 8-9, the shelf insert 404 may include a pair of supports 408, one or more cross beams 410, a cross channel 412, and one or more shelves 414. The one or more shelves 414 may be configured to receive and hold at least one tote 51.

The one or more cross beams 410 may be configured to be placed between the pair of supports 408 that may span between and be supported by two cross rails 409 of the rack 400. For example, an L-shaped notch 411 of each support 408 may be defined by include a top surface configured to abut a top portion a cross rail 409 and a side surface configured to abut a side portion of the cross rail 409. The cross channel 412 may be configured to be placed above the one or more cross beams 410 and between and connected to the pair of supports 408.

Each cross beam 410 may comprise a pair of end hooks 416 configured to respectively be received within and engaged by notches 418 within the pair of supports 408. Each cross beam 410 may further comprise one or more notches 420 disposed along the cross beam 410. Each shelf 414 of the one or more shelves 414 may be configured to be supported by a respective cross beam 410, and each shelf 414 may include a support structure 422 configured to be received in the one or more notches 420 along the respective cross beam 410. Fasteners such as nuts, screws, bolts, and the like for reception in respective apertures or other suitable fastening means understood to be within the scope of this disclosure such as industrial Velcro, solder, and the like may fasten the components of the shelf insert 404 described herein together, and such fasteners may fasten the shelf insert 404 to the upright rail 406 and/or to another shelf insert 404. In embodiments, a flat support panel (not shown) may be positioned below end portions of each shelf 414 and may extend between the pair of supports 408.

Figure 11:
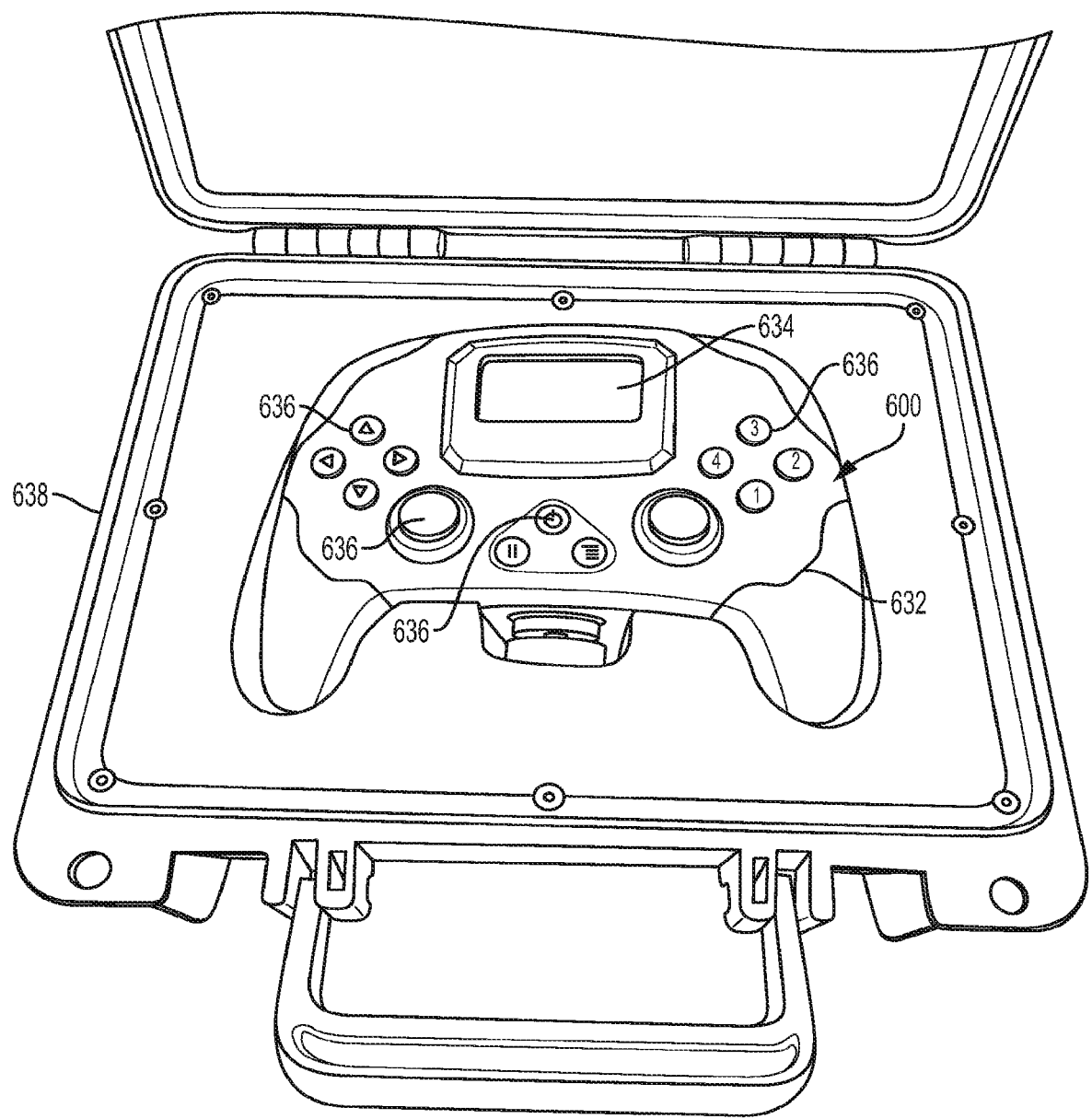
FIG. 11 illustrates the drive unit case of FIG. 2 in an open position to show the removable hand-held drive unit.

Referring to FIGS. 1 and 10-11, the vehicle body 104 of the materials handling vehicle 102 may be described as comprising a fork side 202 and a power unit side 204, with the fork carriage assembly 206 positioned at the fork side 202 of the vehicle body 104 and being movably coupled to the mast assembly 207. The materials handling vehicle 102 may include a sensor location on the fork side 202, the power unit side 204, or both to facilitate autonomous or semi-autonomous vehicle travel. The materials handling vehicle 102 may also comprise an operator compartment 211 that may also be movably coupled to the mast assembly 207. This operator compartment 211 may be positioned between the fork carriage assembly 206 and the power unit side 204 of the vehicle body 104.

A remote controller may include a hand-held drive unit 600 is secured to the vehicle body 104 and comprises a user interface 632 and an operational command generator 633 that is responsive to the user interface 632. In alternative embodiments, the hand-hand drive unit 600 may be remote from and not secured to the vehicle body 104.

The operational command generator 633 may comprise any suitable combination of conventional, or yet-to-be developed, circuitry and software that enables the hand-held drive unit 600 to send operational commands generated in response to user input at the user interface to the vehicular controller(s) to control operational functions of the traction control unit 606, the braking system 604, the steering assembly 608, the mast assembly 207 through the mast assembly control unit 610, the picking attachment 602, or combinations thereof. The hand-held drive unit 600 may be secured to the vehicle body 104 so as to be accessible for removal from the vehicle body 104 from the power unit side 204 of the vehicle body 104 by an operator sharing (such as positioned on) the vehicle transit surface 106 with the wheels 210 supporting the vehicle body 104.

The vehicle body 104 may also comprise a pair of lateral sides 208 extending between the fork side 202 and power unit side 204 of the vehicle body 104, with the lateral sides 208 defining a vehicle width $w_1$. In narrow aisle environments, where when the materials handling vehicle 102 is positioned in a warehouse aisle characterized by an aisle width $w_2$, where $w_2-w_1<W$ inches where W is in a range of from about 2 inches to about 4 inches (and $w_2>w_1$), the hand-held drive unit 600 is secured to the vehicle body 104 so as to be accessible for removal by the operator sharing the vehicle transit surface 106 with the materials handling vehicle 102. The equation above is an example equation for a maximum gap value, and values set forth are not contemplated to a limitation. As a non-limiting example, the hand-held drive unit 600 may be secured to a surface of the power unit side 204 of the vehicle body 104 and may be configured to permit an operator to fully control the materials handling vehicle 102 positioned in a first aisle without a need for the operator to travel down an empty, adjoining aisle next to the first aisle to get to the operator compartment 211 on the fork side 202 of the materials handling vehicle 102. In other words, a retrofitted material handling vehicle 102 may require manual intervention on the part of an operator and, if the operator is located in the first aisle on the power unit side 204 opposite from the operator compartment 211 and unable to fit between the vehicle body 104 and the first aisle, the hand-held drive unit 600 provides a way for the operator to manually intervene without the need to get to the operator compartment 111. It is contemplated that all of the functionality of the hand-held drive unit 600 described herein is duplicated with user controls in the operator compartment 211 such that the operator may control the materials handling vehicle 102 as if the operator were within the operator compartment 211 without actually being in the operator compartment 211.

The vehicular controller(s) may comprise a picking controller 612, a braking controller 614, a traction controller 616, a steering controller 618, a mast controller 620, or one or more integrated controllers, to control operational functions of the picking attachment 602, the braking system 604, traction control unit 606, the steering assembly 608, or the mast assembly control unit 610. Where the vehicular controller comprises a traction controller 616 configured to control operational functions of the traction control unit 606, the user interface 632 of the hand-held drive unit 600 may comprise traction control operators 626. The traction controller 616 may be responsive to operational commands generated with the traction control operators 626 of the hand-held drive unit 600. For example, it is contemplated that the traction control operators 626, and other types of control operators described herein, can be implemented in a variety of ways, such as via virtual buttons provided on a touch screen display 634, physical inputs 636 located on the hand-held drive unit 600 (such as buttons, joysticks, etc.), any of which may be dedicated or customizable. It is contemplated, for example, that the physical inputs 636 may be customized using configurable menu options, scrolling interfaces, or other on-screen options provided at the touch screen display 634. It is also contemplated that the body of the hand-held drive unit 600 could be used as a control operator if the unit were to be provided with one or more motion sensors, such as a gyroscope, accelerometer, etc., to detect movement and/or rotation of the hand-held drive unit 600. In further contemplated embodiments, gesture tracking, gaze tracking, voice control, and other types of indirect control operators may be used.

The vehicular controller(s) may also comprise a braking controller 614 configured to control operational functions of the braking system 604. The user interface of the hand-held drive unit 600 may comprise braking control operators 624. The braking controller 614 may be responsive to operational commands generated with the braking control operators 624 of the hand-held drive unit 600.

Similarly, the vehicular controller(s) may comprise a steering controller 618 configured to control operational functions of the steering assembly 608. In which case, the user interface 632 of the hand-held drive unit 600 would comprise steering control operators 628, and the steering controller 618 would be responsive to operational commands generated with the steering control operators 628.

The vehicular controller(s) may also comprise a mast controller 620 configured to control operational functions of the mast assembly control unit 610 that is configured to control the mast assembly 207. In which case, the user interface 632 of the hand-held drive unit 600 would comprise mast assembly control operators 630, and the mast controller 620 would be responsive to operational commands generated with the mast assembly control operators 630.

The vehicular controller(s) may additionally comprise a picking controller 612 configured to control operational functions of the picking attachment 602. In which case, the user interface 632 of the hand-held drive unit 600 would comprise picking attachment control operators 622, and the picking controller 612 would be responsive to operational commands generated with the picking attachment control operators 622.

The vehicular controller(s) may additionally comprise a carriage controller 621 configured to control operational functions of the carriage control unit 611, which is configured to control the fork carriage assembly 206. In which case, the user interface 632 of the hand-held drive unit 600 would comprise carriage control operators 631, and the carriage controller 621 would be responsive to operational commands generated with the carriage control operators 631.

The materials handling vehicle 102 may further comprise a camera 212 coupled to the fork carriage assembly 206, with the camera 212 being configured to send image data representing objects within a field of view of the camera 212 to the hand-held drive unit 600. The hand-held drive unit 600 may comprise a touch screen display 634 or other type of display for displaying image data representing objects within the field of view of the camera 212. In this manner, a ground-based operator can use the image data as an aide to using the hand-held drive unit 600 to control various functions of the materials handling vehicle 102. This is particularly advantageous where the field of view of the camera 212 extends beyond the field of view of an operator sharing a vehicle transit surface 106 with the materials handling vehicle 102. In some embodiments, the hand-held drive unit 600 may be configured to allow an operator to view images of the picking attachment 602 and send operational commands to the picking controller 612 through picking attachment control operators 622 of the hand-held drive unit 600 to control operational functions of the picking attachment 602.

It is also contemplated that the hand-held drive unit 600 may be configured to control the field of view of the camera 212. For example, the field of view of the camera 212 may be controlled by changing the position or orientation of the camera 212, by controlling the zoom of the camera optics, by controlling an aiming direction of the camera optics, or combinations thereof. In various embodiments, the hand-held drive unit 600 is configured to control focusing optics of the camera 212. In other embodiments, the camera 212 may be coupled to the fork carriage assembly 206 by a camera positioner 214, and the hand-held drive unit 600 may be configured to control the operational functions of the camera positioner 214.

It is also contemplated that the camera 212 may be coupled to the fork carriage assembly 206 either internally or externally. An internally-coupled camera could reside at least partially within the fork carriage assembly 206, such as with a pinhole camera. An externally-coupled camera may be attached to the fork carriage assembly 206 by any suitable means, such as with coupling mechanisms (screws, bolts, etc.), attachment mechanisms (camera base-mounts, brackets, etc.), adhesives, or combinations thereof.

In many cases, it will be advantageous to ensure that the hand-held drive unit 600 is secured to a surface of the vehicle body 104 that is not located within a path of vertical movement of the fork carriage assembly 206. In this manner, by ensuring that the drive unit 600 is accessible from the power unit side 204, and not the fork side 202 of the materials handling vehicle 102, the operator will not be required to walk under the fork carriage assembly 206 to access the hand-held drive unit 600. In some embodiments, it may be sufficient to merely ensure that the hand-held drive unit 600 is secured to a surface of the vehicle body 104 that is not located at the fork side 202 of the vehicle body 104. In other embodiments, it may be advantageous to ensure that the hand-held drive unit 600 is held within a drive unit case 638, and the drive unit case 638 is secured to the vehicle body 104. For example, referring to FIG. 2, the materials handling vehicle 102 includes the drive unit case 638 housing the hand-held drive unit 600 at the power unit side 204 of the materials handling vehicle 102.

It is contemplated that the hand-held drive unit 600 described above may be secured to the materials handling vehicle 102, or may be present at a location remote from the materials handling vehicle 102. Further, the functionality of the hand-held drive unit 600 may be presented more broadly in the form of a remote controller that is communicatively coupled to the materials handling vehicle 102 through, for example, a wireless communication link. The remote controller may or may not be a hand-held and may or may not be secured to the materials handling vehicle 102. The remote controller may comprise a video link to display image data from the camera 212. Contemplated remote controllers may, for example, be presented as a desktop computer, a laptop computer, a smartphone, a tablet, a wearable computing device, or some combination thereof. It is also contemplated that the remote controller, whether hand-held or not, may be utilized in a dual mode operation where user control is facilitated from two separate remote controllers. For example, and not by way of limitation, in one type of dual mode operation, a user is able to control vehicular operations through a remote controller at a remote location, such as through a laptop computer, while also permitting the same or another user to sign in through a secured webpage or a software application loaded on a smartphone, or other hand-held device, to control such vehicular operations. Regardless of the mode of operation, it is contemplated that the remote controller may be utilized by an operator at a location that is remote from the materials handling vehicle 102, or by an operator sharing the vehicle transit surface 106 with the materials handling vehicle 102.

Figure 12:
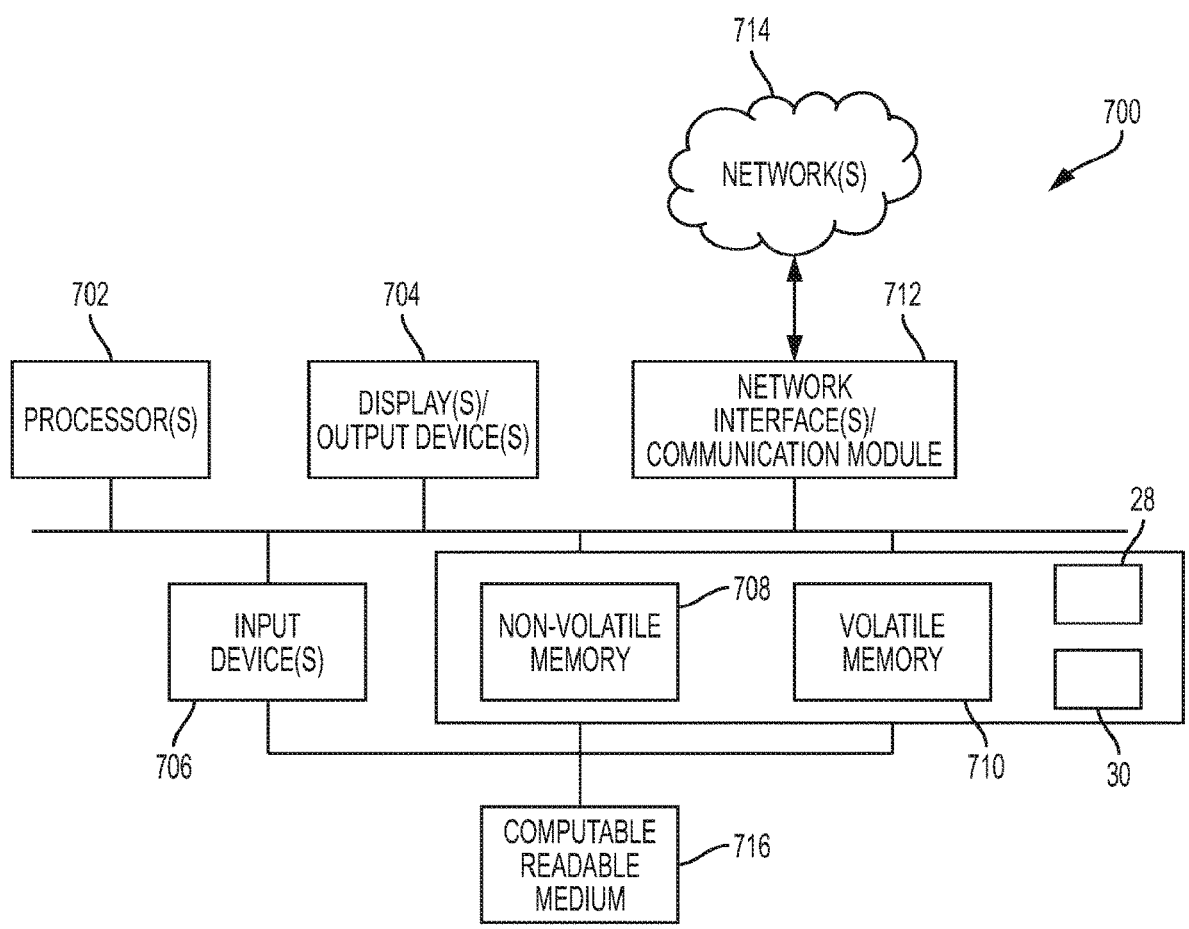
FIG. 12 is a schematic illustration of a computing device according to various embodiments shown and described herein.

Referring to FIG. 12, a block diagram illustrates a computing device 700, through which embodiments of the disclosure can be implemented. The computing device 700 described herein is but one example of a suitable computing device and does not suggest any limitation on the scope of any embodiments presented. For example, the computing device 700 in some embodiments is an example of the remote controller such as the hand-held drive unit 600 described herein and/or other suitable mobile client devices that may be communicatively coupled to the hand-held drive unit 600. The computing device 700 may be communicatively coupled to one or more computing devices through a warehouse management system. Nothing illustrated or described with respect to the computing device 700 should be interpreted as being required or as creating any type of dependency with respect to any element or plurality of elements. In various embodiments, a computing device 700 may include, but need not be limited to, a desktop, laptop, server, client, tablet, smartphone, or any other type of device that can compress data. In an embodiment, the computing device 700 includes at least one processor 702 and memory (non-volatile memory 708 and/or volatile memory 710). In embodiments, the one or more target TOF depth maps 28 and/or one or more warehouse maps 30 described herein may be stored in the memory. The computing device 700 can include one or more displays (such as the touch screen display 634 of the hand-hand drive unit 600) and/or output devices 704 such as monitors, speakers, headphones, projectors, wearable-displays, holographic displays, and/or printers, for example. Output devices 704 may be configured to output audio, visual, and/or tactile signals and may further include, for example, audio speakers, devices that emit energy (radio, microwave, infrared, visible light, ultraviolet, x-ray and gamma ray), electronic output devices (Wi-Fi, radar, laser, etc.), audio (of any frequency), etc.

The computing device 700 may further include one or more input devices 706 which can include, by way of example, any type of mouse, keyboard, disk/media drive, memory stick/thumb-drive, memory card, pen, touch-input device, biometric scanner, voice/auditory input device, motion-detector, camera, scale, and the like. Input devices 706 may further include sensors, such as biometric (voice, facial-recognition, iris or other types of eye recognition, hand geometry, fingerprint, DNA, or any other suitable type of biometric data, etc.), video/still images, motion data (accelerometer, GPS, magnetometer, gyroscope, etc.) and audio (including ultrasonic sound waves). Input devices 706 may further include cameras (with or without audio recording), such as digital and/or analog cameras, still cameras, video cameras, thermal imaging cameras, infrared cameras, cameras with a charge-couple display, night-vision cameras, three-dimensional cameras, webcams, audio recorders, and the like. For example, an input device 706 may include the camera 212 described herein.

The computing device 700 typically includes non-volatile memory 708 (ROM, flash memory, etc.), volatile memory 710 (RAM, etc.), or a combination thereof. A network interface 712 can facilitate communications over a network 714 via wires, via a wide area network, via a local area network, via a personal area network, via a cellular network, via a satellite network, etc. Suitable local area networks may include wired Ethernet and/or wireless technologies such as, for example, wireless fidelity (Wi-Fi). Suitable personal area networks may include wireless technologies such as, for example, IrDA, Bluetooth, Wireless USB, Z-Wave, ZigBee, and/or other near field communication protocols. Suitable personal area networks may similarly include wired computer buses such as, for example, USB and FireWire. Suitable cellular networks include, but are not limited to, technologies such as LTE, WiMAX, UMTS, CDMA, and GSM. Network interface 712 can be communicatively coupled to any device capable of transmitting and/or receiving data via the network 714. Accordingly, the network interface hardware 712 can include a communication transceiver for sending and/or receiving any wired or wireless communication. For example, the network interface hardware 712 may include an antenna, a modem, LAN port, Wi-Fi card, WiMax card, mobile communications hardware, near-field communication hardware, satellite communication hardware and/or any wired or wireless hardware for communicating with other networks and/or devices.

A computer-readable medium 716 may comprise a plurality of computer readable mediums, each of which may be either a computer readable storage medium or a computer readable signal medium. A computer readable storage medium 716 may be non-transitory in that it excludes any transitory, propagating signal as a storage medium and may reside, for example, within an input device 706, non-volatile memory 708, volatile memory 710, or any combination thereof. A computer readable storage medium can include tangible media that is able to store instructions associated with, or used by, a device or system. A computer readable storage medium includes, by way of example: RAM, ROM, cache, fiber optics, EPROM/Flash memory, CD/DVD/BD-ROM, hard disk drives, solid-state storage, optical or magnetic storage devices, diskettes, electrical connections having a wire, or any combination thereof. A computer readable storage medium may also include, for example, a system or device that is of a magnetic, optical, semiconductor, or electronic type. Computer readable storage media and computer readable signal media are mutually exclusive.

A computer readable signal medium can include any type of computer readable medium that is not a computer readable storage medium and may include, for example, propagated signals taking any number of forms such as optical, electromagnetic, or a combination thereof. A computer readable signal medium may include propagated data signals containing computer readable code, for example, within a carrier wave. Computer readable storage media and computer readable signal media are mutually exclusive.

The computing device 700 may include one or more network interfaces 712 to facilitate communication with one or more remote devices, which may include, for example, client and/or server devices. A network interface 712 may also be described as a communications module, as these terms may be used interchangeably. For clarity, it is noted that usage of the term "in communication with" herein, with respect to the FIG. 12, or elsewhere, may refer to one-way communication or two-way communication.

It is contemplated that the present disclosure enables an existing workspace designed for palletized loads to be retrofitted to increase picking density of the existing shelving with the shelf insert 404 or rack module 34 and the addition of the picking attachment 602 to the materials handling vehicle 102 which may be, for example, a forklift. For example, the shelf insert 404 may be a retrofit of palletized shelving. Controllers and semi-autonomous/and/or autonomous hardware enables such retrofitted equipment to pick and place totes 51 or other objects automatically without a need to procure specific robotic pick and place equipment and storage units.

Figure 16:
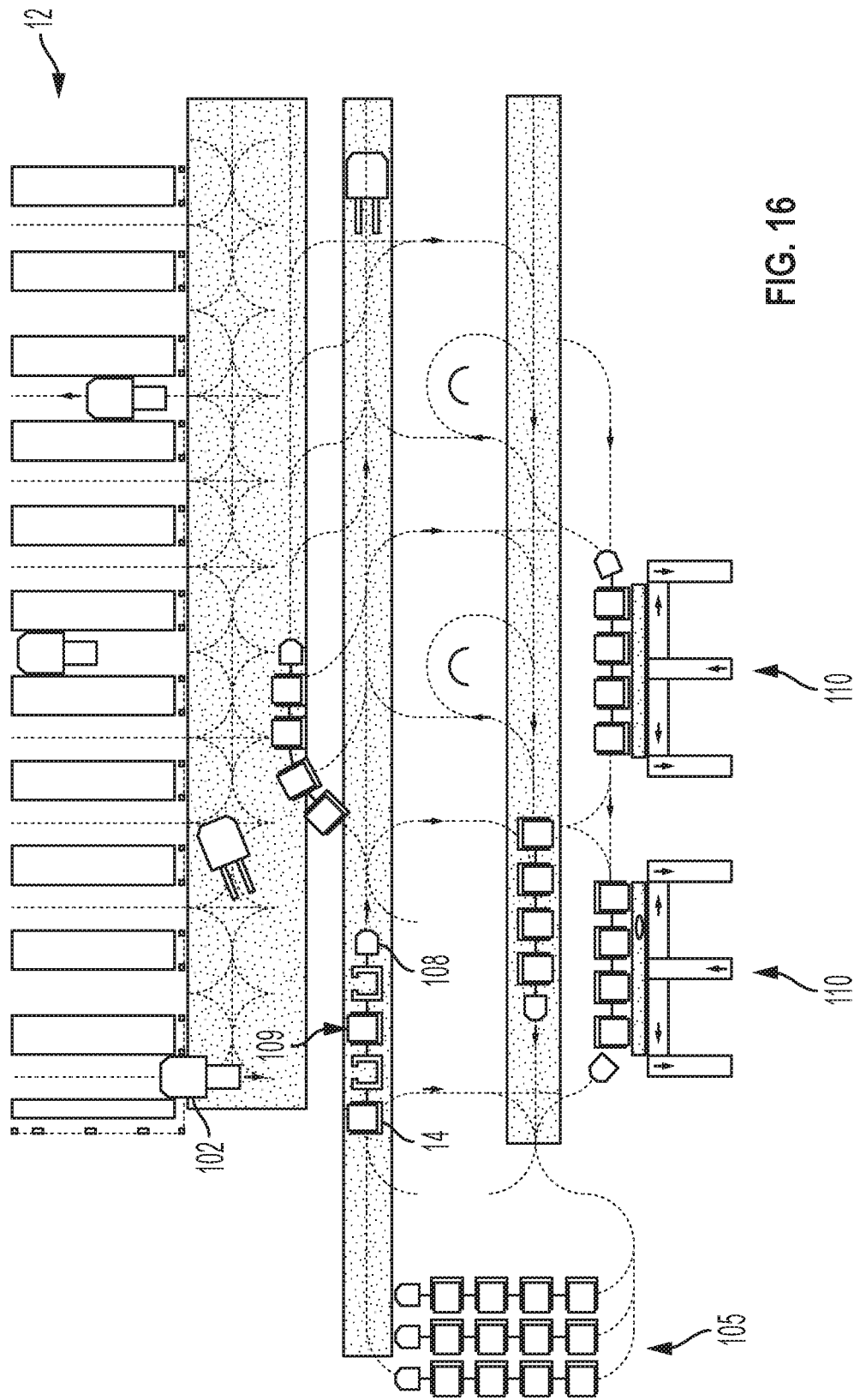
FIG. 16 illustrates a goods-to-man warehousing system with a pick station configuration according to various embodiments shown and described herein.

It is contemplated that the goods storage and retrieval systems 10 described herein may be integrated with a variety of additional hardware to build a complete goods-to-man warehousing system. This additional hardware may, for example, comprise conventional, or yet-to-be developed, pick station hardware, transit hardware for mobile storage carts, cart loading station hardware, or any other warehouse hardware facilitating the integration of the goods storage and retrieval systems 10 described herein into a complete goods-to-man warehousing system. For example, FIG. 16 illustrates a goods-to-man warehousing system comprising: materials handling vehicles 102 and a multilevel warehouse racking system 12 configured as described above; additional warehouse aisles for accommodating the transit of AGV-enabled tugger trains 108, which may be loaded with mobile storage carts 14; a staging area 105 for AGV-enabled tugger trains; a battery charging station to which materials handling vehicles 102 may traverse; and two goods-to-man pick stations 110 configured to feed empty totes to an operator at the pick station for the transfer of goods picked from mobile storage carts 14 to a put wall for order consolidation. In operation, the materials handling vehicles transfer mobile storage carts 14 to the tugger trains 108 at one or more designated pick and delivery (P&D) stations 109, which stations may function as the cart home position 16 described above. The AGV-enabled tugger trains 108 subsequently transfer the mobile storage carts 14 to the goods-to-man pick stations 110 for order picking and consolidation.

It is contemplated that the materials handling vehicles 102 may operate autonomously in a user restricted area in individual aisles and that there may be only one vehicle per aisle. Alternatively, a single materials handling vehicle 102 may traverse between different aisles. It is also contemplated that the materials handling vehicles 102 may be communicatively coupled to a warehouse management system (WMS), or other logistics system, such that the vehicle is given locations along each aisle to pick or place articles in warehouse racks on either side of the aisle. For example, to pick articles to fill a pick cart, it is contemplated that a materials handling vehicle 102 may couple with a mobile storage cart 14 at the P&D station 109, or another type of designated cart home position, as described above. The vehicle 102 will traverse individual aisles until either the cart 14 is filled, or the WMS indicates that no other articles are required. The vehicle 102 will then place the cart 14 in the P&D station 109 for pick-up by a tugger train 108. Alternatively, the vehicle 102 may position the cart 14 such that it is coupled to the tugger train 108. In either case, the tugger train 108 then transports the cart 14 to a goods-to-man pick station 110 where either a user or another article manipulator will retrieve articles from the cart 14 to fill individual totes for packaging and shipping.

To place articles in the racks of the multilevel warehouse racking system 12, along the aisles, a mobile storage cart 14 is filled with articles at a goods-to-man pick station 110. A tugger train 108 then retrieves the mobile storage cart 14 and transports it to the P&D station 109. A materials handling vehicle 102 couples with the cart 14 and proceeds to transfer articles from the cart 14 to pick locations in the warehouse racks. Empty carts 14 can be placed in the P&D station 109 for transport to a storage area by a tugger train 108, or can be left on the materials handling vehicle for future article picking. It is also contemplated that a mobile storage cart 14 may be passed between vehicles 102 within a P&D station 109 such that multiple vehicles 102 are used to fill and/or empty a cart 14 among multiple aisles. It is contemplated that the mobile storage carts 14 may comprise location indicia such that a vision system and/or user at the goods to man station can place/pick an article in the proper location and maintain the integrity of WMS data.

Figure 17:
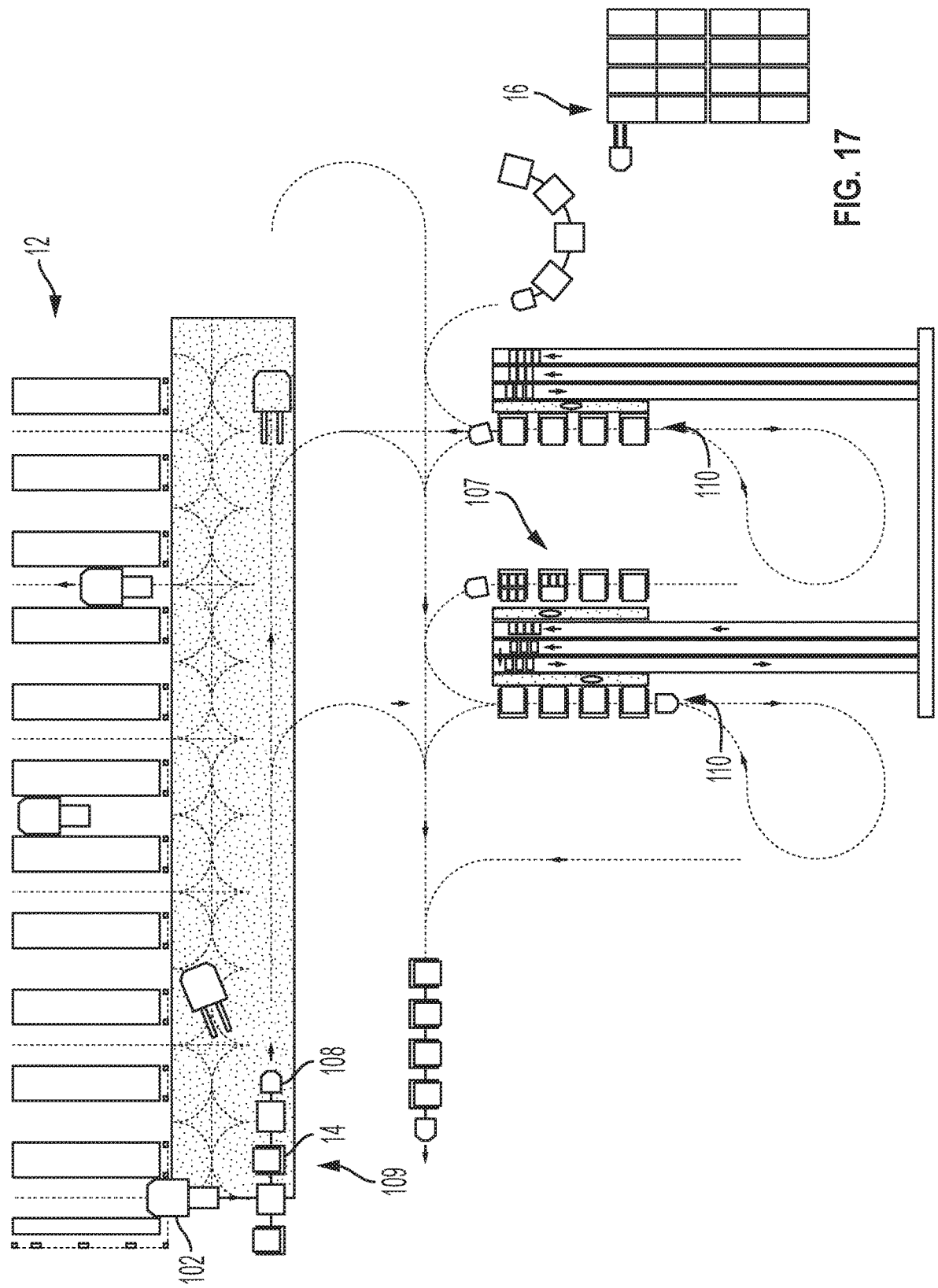
FIG. 17 illustrates a goods-to-man warehousing system with another pick configuration according to various embodiments shown and described herein.

FIG. 17, which uses the same reference numbers as FIG. 16 to illustrate like components, illustrates a goods-to-man warehousing system with a different pick station configuration and a cart loading station defining a different type of cart home position 16, i.e., a cart home position 16 that is removed from the P&D station 109. The pick station configuration of FIG. 17 is similar to that of FIG. 16 in that it includes two goods-to-man pick stations 110, but it also includes a goods-to-man replenish station 107, which allows an operator to provide goods for replenishing stock in the multilevel warehouse racking system 12.

Figure 18:
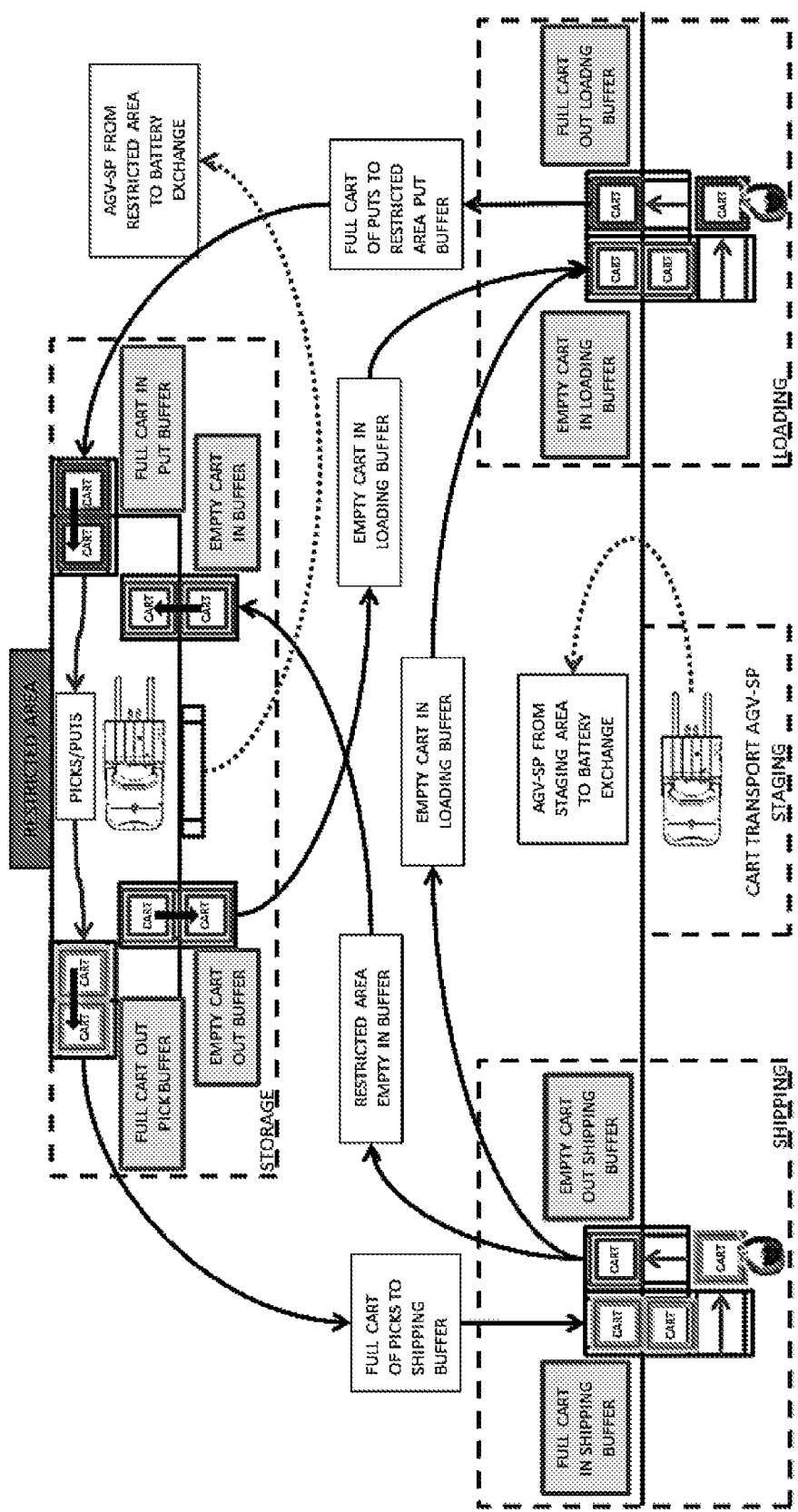
FIG. 18 illustrates a process for integration and utilization with the goods-to-man warehousing system of FIG. 16 and/or FIG. 17.

FIG. 18 illustrates a process for integration and utilization with the goods-to-man warehousing systems of FIG. 16 and/or FIG. 17. In particular, FIG. 18 illustrates a process of exchanging one or more mobile storage carts 14 between at least two of a storage area, a shipping area, and a loading area. Such mobile storage cart(s) 14 may be engaged with a materials handling vehicle 102 or coupled to the tugger train 108 as described herein. With respect to an exchange between the storage area at the top of FIG. 18, which is part of a restricted area, and the loading area, an empty mobile storage cart may proceed to exit the storage area through an empty cart out buffer. The empty mobile storage cart, i.e., an "empty" cart, may then travel along a path to cross an empty cart in loading buffer to enter the loading area. In the loading area, the empty cart may be loaded while moving between one or more zones in a goods-to-man station 110. It is contemplated that an empty cart may be loaded with articles for multiple orders in, for example, the loading area such that a single cycle through the goods-to-man station 110 will load the empty cart and increase system efficiency by reducing a number of carts transitioning through the system within the process. Thus, the empty cart is loaded with one or more objects to become a partially full or full cart, i.e., a "loaded" cart, which proceeds out of the loading area through a full cart out loading buffer. In an exchange between the loading area and the storage area, the loaded cart travels along a path crossing a full cart of puts to restricted area put buffer to be received in a full cart in put buffer in the storage area.

One or more materials handling vehicles 102 may cooperate with the full cart with respect to put and place operations as described herein. For example, an inventory exchange may occur between objects from the arriving loaded cart with objects (such as totes) stored within one or more very narrow aisles or regular aisles that the materials handling vehicle(s) 102 travel between. In an exchange between the storage area and the shipping area, the previously loaded cart, or a newly loaded cart post such an inventory exchange, may then exit the storage area through the full cart out pick buffer to travel along a path crossing the full cart of picks to shipping buffer for entry into the full cart in shipping buffer in the shipping area. In the shipping area, the loaded cart may be emptied at, for example, another goods-to-man station 110. It is contemplated that the loaded cart may be loaded with articles for multiple orders such that a single cycle through the goods-to-man station 110 will empty the loaded cart and increase system efficiency by reducing the number of carts transitioning through the system within the process. The items emptied from the cart(s) may then be prepared for shipping and delivery.

In an exchange between the shipping area and the storage area, the emptied cart may exist the shipping area through an empty cart out shipping buffer to travel along a path that crosses a restricted area empty in buffer and enters the storage area (i.e., the restricted area) through an empty cart in buffer. The emptied cart may then travel through the restricted area to participate in pick and put operations as described herein or may exist the storage area through the empty cart out buffer as described above to be loaded in the loading area.

Alternatively, in an exchange between the shipping area and the loading area, the emptied cart may exist the shipping area through an empty cart out shipping buffer to travel along a path that crosses the empty cart in loading buffer to arrive back through the empty cart in loading buffer at the loading area to repeat one or more steps of the process as described above. The steps of this process are not restricted to the order described above and may occur to exchange goods and carts between at least two of the areas. In embodiments, one or more of the goods-to-man load station(s) and the goods-to-man shipping station(s) may be identical.

Further, a materials handling vehicle 102 engaged with a mobile storage cart 14 may be positioned at a staging area 105 and may travel from the staging area 105 to a battery exchange area in order to change a battery at a battery changing station. Similarly, a materials handling vehicle 102 engaged with a mobile storage cart 14 in the restricted area may travel to the battery exchange area.

For the purposes of describing and defining the present invention, it is noted that reference herein to a characteristic of the subject matter of the present disclosure being "based on" a parameter, variable, or other characteristic is not intended to denote that the characteristic is exclusively based on the listed parameter, variable, or characteristic. Rather, reference herein to a characteristic that is a "based" on a listed parameter, variable, etc., is intended to be open ended such that the characteristic may be based on a single parameter, variable, etc., or a plurality of parameters, variables, etc.

It is also noted that recitations herein of "at least one" or "one or more" components, elements, etc., should not be used to create an inference that the alternative use of the articles "a" or "an" should be limited to a single component, element, etc.

It is noted that recitations herein of a component of the present disclosure being "configured" in a particular way, to embody a particular property, or to function in a particular manner, are structural recitations, as opposed to recitations of intended use. More specifically, the references herein to the manner in which a component is "configured" denotes an existing physical condition of the component and, as such, is to be taken as a definite recitation of the structural characteristics of the component.

Having described the subject matter of the present disclosure in detail and by reference to specific embodiments thereof, it is noted that the various details disclosed herein should not be taken to imply that these details relate to elements that are essential components of the various embodiments described herein, even in cases where a particular element is illustrated in each of the drawings that accompany the present description. Further, it will be apparent that modifications and variations are possible without departing from the scope of the present disclosure, including, but not limited to, embodiments defined in the appended claims. More specifically, although some aspects of the present disclosure are identified herein as preferred or particularly advantageous, it is contemplated that the present disclosure is not necessarily limited to these aspects.

It is noted that one or more of the following claims utilize the term "wherein" as a transitional phrase. For the purposes of defining the present invention, it is noted that this term is introduced in the claims as an open-ended transitional phrase that is used to introduce a recitation of a series of characteristics of the structure and should be interpreted in like manner as the more commonly used open-ended preamble term "comprising."

What is claimed is:

1. A goods storage and retrieval system, comprising
a multilevel warehouse racking system,
a mobile storage cart,
a cart home position, and
a materials handling vehicle disposed on a vehicle transit surface, wherein:
the materials handling vehicle comprises a fork carriage assembly, a cart engagement subsystem, a navigation subsystem, and one or more vehicular controllers in communication with the cart engagement subsystem and the navigation subsystem;
the cart engagement subsystem is characterized by a cart engagement field of view; and
the one or more vehicular controllers of the materials handling vehicle executes vehicle functions to
(i) use the navigation subsystem to navigate the materials handling vehicle along the vehicle transit surface to a localized engagement position where the cart home position is within the cart engagement field of view, and
(ii) use the cart engagement subsystem to engage the mobile storage cart in the cart home position with the fork carriage assembly.

2. The goods storage and retrieval system as claimed in claim 1 wherein:
the cart engagement subsystem is further characterized by a close approach field of view that is more restricted than the cart engagement field of view;
the cart engagement subsystem transitions from an initial approach mode in the cart engagement field of view to a close approach mode in the close approach field of view as the cart home position moves into the close approach field of view;
the cart engagement subsystem comprises a time-of-flight (TOF) system characterized by the close approach field of view;
the close approach mode relies primarily on the TOF system as the cart home position moves into the close approach field of view;
the cart engagement subsystem is configured to generate a target TOF depth map of the mobile storage cart; and
the one or more vehicular controllers of the materials handling vehicle executes vehicle functions to
(i) use the cart engagement subsystem to generate the target TOF depth map of the mobile storage cart in the cart home position, and
(ii) use the cart engagement subsystem to determine a range position of the mobile storage cart with respect to the cart engagement subsystem based on the target TOF depth map.

3. The goods storage and retrieval system as claimed in claim 1 wherein:
the cart engagement subsystem comprises a vision system and a time-of-flight (TOF) system;
the cart engagement subsystem is further characterized by a close approach field of view that is more restricted than the cart engagement field of view;
the cart engagement field of view is defined by the vision system;
the close approach field of view is defined by the TOF system; and
the cart engagement subsystem transitions from cart engagement operations that rely primarily on the vision system to cart engagement operations that rely primarily on the TOF system as the cart home position moves into the close approach field of view.

4. The goods storage and retrieval system as claimed in claim 1 wherein at least one of the cart engagement subsystem and the navigation subsystem is operatively coupled to at least one of a traction control unit, a braking system, a steering assembly, a mast assembly control unit, a carriage control unit, and a picking attachment of the materials handling vehicle, the picking attachment secured to the fork carriage assembly movably coupled to a mast assembly, to facilitate cart engagement.

5. The goods storage and retrieval system as claimed in claim 1 wherein:
the navigation subsystem comprises one or more environmental sensors and an environmental database;
the environmental sensors are configured to capture data indicative of a position of the materials handling vehicle relative to the multilevel warehouse racking system, the vehicle transit surface, or both;
the environmental database comprises stored data indicative of the multilevel warehouse racking system, the vehicle transit surface, or both; and
the navigation subsystem is configured to enable at least partially automated navigation of the materials handling vehicle along the vehicle transit surface utilizing the captured data and the stored data.

6. The goods storage and retrieval system as claimed in claim 1 wherein:
a warehouse map is stored in a memory communicatively coupled to the one or more vehicular controllers; and the one or more vehicular controllers of the materials handling vehicle executes vehicle functions to
(i) use the navigation subsystem to determine a localized position of the materials handling vehicle with respect to the vehicle transit surface of a warehouse based on a position of the materials handling vehicle in the warehouse in comparison with the warehouse map, and
(ii) use the navigation system to track navigation of the materials handling vehicle along the vehicle transit surface based on the localized position, navigate the materials handling vehicle along the vehicle transit surface in at least a partially automated manner, or both.

7. The goods storage and retrieval system as claimed in claim 1 wherein:
the materials handling vehicle further comprises a picking attachment subsystem comprising a picking attachment and a time-of-flight (TOF) system;
the picking attachment is secured to the fork carriage assembly that is movably coupled to a mast assembly of the materials handling vehicle;
the picking attachment comprises an X-Y-Z-$\Psi$ positioner;
the picking attachment subsystem is configured to generate a target TOF depth map of a target tote; and
the one or more vehicular controllers of the materials handling vehicle executes vehicle functions to use the X-Y-Z-$\Psi$ positioner of the picking attachment subsystem to engage the target tote with the picking attachment based on the target TOF depth map.

8. The goods storage and retrieval system as claimed in claim 7 wherein the navigation subsystem is configured to position the materials handling vehicle such that the target tote is within a tote engagement field of view of the TOF system.

9. The goods storage and retrieval system as claimed in claim 7 wherein:
the navigation subsystem comprises a vision system;
the multilevel warehouse racking system comprises a target fiducial associated with the target tote;
the navigation subsystem is configured to position the materials handling vehicle such that the target fiducial is within a field of view of the vision system; and
the navigation subsystem is configured to utilize the target fiducial to position the materials handling vehicle such that the target tote is within a tote engagement field of view of the TOF system.

10. The goods storage and retrieval system as claimed in claim 7 wherein the X-Y-Z-$\Psi$ positioner comprises an X-positioner configured to move the picking attachment in a first degree of freedom along a first lateral axis in a lateral plane, a Y-positioner configured to move the picking attachment in a second degree of freedom along a second lateral axis perpendicular to the first lateral axis in the lateral plane, a Z-positioner configured to move the picking attachment in a third degree of freedom along a Z-axis perpendicular to the first lateral axis and the second lateral axis, and a rotational $\Psi$-positioner configured to rotate the picking attachment in a fourth degree of freedom about the Z-axis.

11. A materials handling vehicle configured to navigate a vehicle transit surface, the materials handling vehicle comprising
a fork carriage assembly,
a cart engagement subsystem,
a navigation subsystem, and
one or more vehicular controllers in communication with the cart engagement subsystem and the navigation subsystem, wherein:
the cart engagement subsystem is characterized by a cart engagement field of view; and
the one or more vehicular controllers of the materials handling vehicle executes vehicle functions to
(i) use the navigation subsystem to navigate the materials handling vehicle along the vehicle transit surface to a localized engagement position where a cart home position is within the cart engagement field of view, and
(ii) use the cart engagement subsystem to engage a mobile storage cart in the cart home position with the fork carriage assembly.

12. A method of operating a goods storage and retrieval system, the method comprising:
providing the goods storage and retrieval system comprising a multilevel warehouse racking system, a mobile storage cart, a cart home position, and a materials handling vehicle disposed on a vehicle transit surface, wherein
the materials handling vehicle comprises a fork carriage assembly, a cart engagement subsystem, a navigation subsystem, and one or more vehicular controllers in communication with the cart engagement subsystem and the navigation subsystem, and
the cart engagement subsystem is characterized by a cart engagement field of view;
navigating the materials handling vehicle along the vehicle transit surface to a localized engagement position where the cart home position is within the cart engagement field of view through use of the navigation subsystem and the one or more vehicular controllers; and
engaging the mobile storage cart in the cart home position with the fork carriage assembly through use of the cart engagement subsystem.

13. The method as claimed in claim 12 further comprising:
engaging or disengaging a target tote positioned in the mobile storage cart or the multilevel warehouse racking system with a picking attachment secured to the fork carriage assembly and comprising an X-Y-Z-$\Psi$ positioner through use of the X-Y-Z-$\Psi$ positioner.

14. The method as claimed in claim 12 further comprising:
assigning a velocity number to a stock keeping unit (SKU) associated with a target tote in the multilevel warehouse racking system based on an order velocity indicative of a frequency of usage parameter associated with the target tote.

15. The method as claimed in claim 14 further comprising:
associating a relatively high velocity number with a low storage position on a low shelf of the multilevel warehouse racking system;
associating a relatively low velocity number with a high storage position on a high shelf of the multilevel warehouse racking system; and
using a picking attachment secured to the fork carriage assembly and the fork carriage assembly to move the target tote from a portion of the multilevel warehouse racking system associated with one of the relatively low velocity number and the relatively high velocity number to a portion of the multilevel warehouse racking system respectively associated with one of the relatively high velocity number and the relatively low velocity number based on a respective increase or decrease in the order velocity with respect to the target tote.

16. The method as claimed in claim 14 further comprising:
engaging a first target tote at a first storage position on a high shelf associated with a relatively low velocity number with the picking attachment;
placing with a picking attachment secured to the fork carriage assembly the first target tote in the mobile storage cart engaged by the fork carriage assembly;
navigating the materials handling vehicle to a second target tote when the second target tote is assigned a relatively high velocity number and is within a close distance to the first storage position;
engaging the second target tote with the picking attachment;
lowering the second target tote to a low shelf associated with the relatively high velocity number or placing the second target tote in the mobile storage cart with the picking attachment;
navigating the materials handling vehicle to a subsequent pick location when the second target tote is placed in the mobile storage cart; and
placing the second target tote on the low shelf associated with the relatively high velocity number while at the subsequent pick location.

17. The method as claimed in claim 14 further comprising:
engaging a first target tote at a first storage position on a low shelf associated with a relatively high velocity number with a picking attachment secured to the fork carriage assembly;
placing with the picking attachment the first target tote in the mobile storage cart engaged by the fork carriage assembly;
navigating the materials handling vehicle to a second target tote when the second target tote is assigned a relatively low velocity number and is within a close distance to the first storage position on the low shelf;
engaging the second target tote with the picking attachment;
raising the second target tote to a high shelf associated with the relatively low velocity number or placing the second target tote in the mobile storage cart with the picking attachment;
navigating the materials handling vehicle to a subsequent pick location when the second target tote is placed in the mobile storage cart; and
placing the second target tote on the high shelf associated with the relatively low velocity number while at the subsequent pick location.

18. The method as claimed in claim 12 further comprising:
positioning the materials handling vehicle in a first aisle of the multilevel warehouse racking system;
placing with a picking attachment secured to the fork carriage assembly one or more target totes in the mobile storage cart engaged by the fork carriage assembly; and
using the mobile storage cart as a temporary storage location to level inventory when one or more inventory orders are received such that the one or more target totes are shuffled between the mobile storage cart and a plurality of shelves of the multilevel warehouse racking system based on a respective order velocity indicative of a frequency of usage parameter associated with each target tote to optimize a usage parameter with respect to the first aisle.

19. The method as claimed in claim 18 further comprising:
assigning a relatively low velocity number associated with a high shelf of the multilevel warehouse racking system to a SKU associated with a first target tote;
storing the first target tote in the mobile storage cart;
assigning a relatively high velocity number associated with a low shelf of the multilevel warehouse racking system to a SKU associated with a second target tote;
receiving information indicative of the second target tote being stored on a high shelf of the multilevel warehouse racking system;
navigating the materials handling vehicle to a location of the multilevel warehouse racking system associated with the high shelf during an off-peak picking time or an off shift time;
moving the mobile storage cart engaged by the fork carriage assembly to the high shelf;
exchanging with the picking attachment the first target tote stored in the mobile storage cart with the second target tote stored on the high shelf to store the second target tote in the mobile storage cart.

20. The method as claimed in claim 12 further comprising:
placing with a picking attachment secured to the fork carriage assembly one or more target totes in the mobile storage cart engaged by the fork carriage assembly such that the mobile storage cart is utilized as a temporary storage location;
interleaving picking attachment pick and place operations by picking up and placing away multiple target totes during a single trip of the materials handling vehicle down an aisle of the multilevel warehouse racking system.

* * * * *